United States Patent [19]

Waaske

[11] 4,274,729
[45] Jun. 23, 1981

[54] PHOTOGRAPHIC STILL CAMERA

[76] Inventor: Heinz Waaske, Am Hasengarten 2, 3300 Braunschweig, Fed. Rep. of Germany

[21] Appl. No.: 167,316

[22] Filed: Jul. 10, 1980

[30] Foreign Application Priority Data

Nov. 2, 1979 [DE] Fed. Rep. of Germany ....... 2944137

[51] Int. Cl.³ .................... G03B 17/26; G03B 17/00; G03B 17/42
[52] U.S. Cl. ................................... 354/275; 354/203; 354/204
[58] Field of Search ............... 354/152, 158, 157, 289, 354/204–206, 212–214, 203, 275, 288

[56] References Cited

U.S. PATENT DOCUMENTS

| 1,947,483 | 2/1934 | Mihalyi | 354/212 |
| 2,378,406 | 6/1945 | Harris | 354/212 |
| 2,674,166 | 4/1954 | Sochor | 354/204 |
| 2,788,724 | 4/1957 | Weiss | 354/203 |
| 3,780,634 | 12/1973 | Van Osch | 354/275 |

FOREIGN PATENT DOCUMENTS

| 604785 | 10/1934 | Fed. Rep. of Germany | 354/203 |
| 1221095 | 7/1966 | Fed. Rep. of Germany | 354/288 |

Primary Examiner—Donald A. Griffin
Attorney, Agent, or Firm—Michael J. Striker

[57] ABSTRACT

A still camera has a housing formed with a receptacle for receiving an exchangeable cassette unit assembled of a main cassette part connectable to the inlet of the receptacle and an extendable cassette part which is displaceable into the camera body. The interior of the housing includes a stationary film framing platform defining a film gate; a removable rear wall of the housing supports a sliding carriage for entraining the detachable cassette part, a swingable film pressure plate which is normally located behind the path of movement of the carriage and is operable to swing up against the film gate, and common control means for actuating in a predetermined sequence the movements of the sliding carriage and of the swingable film pressure plate.

57 Claims, 16 Drawing Figures

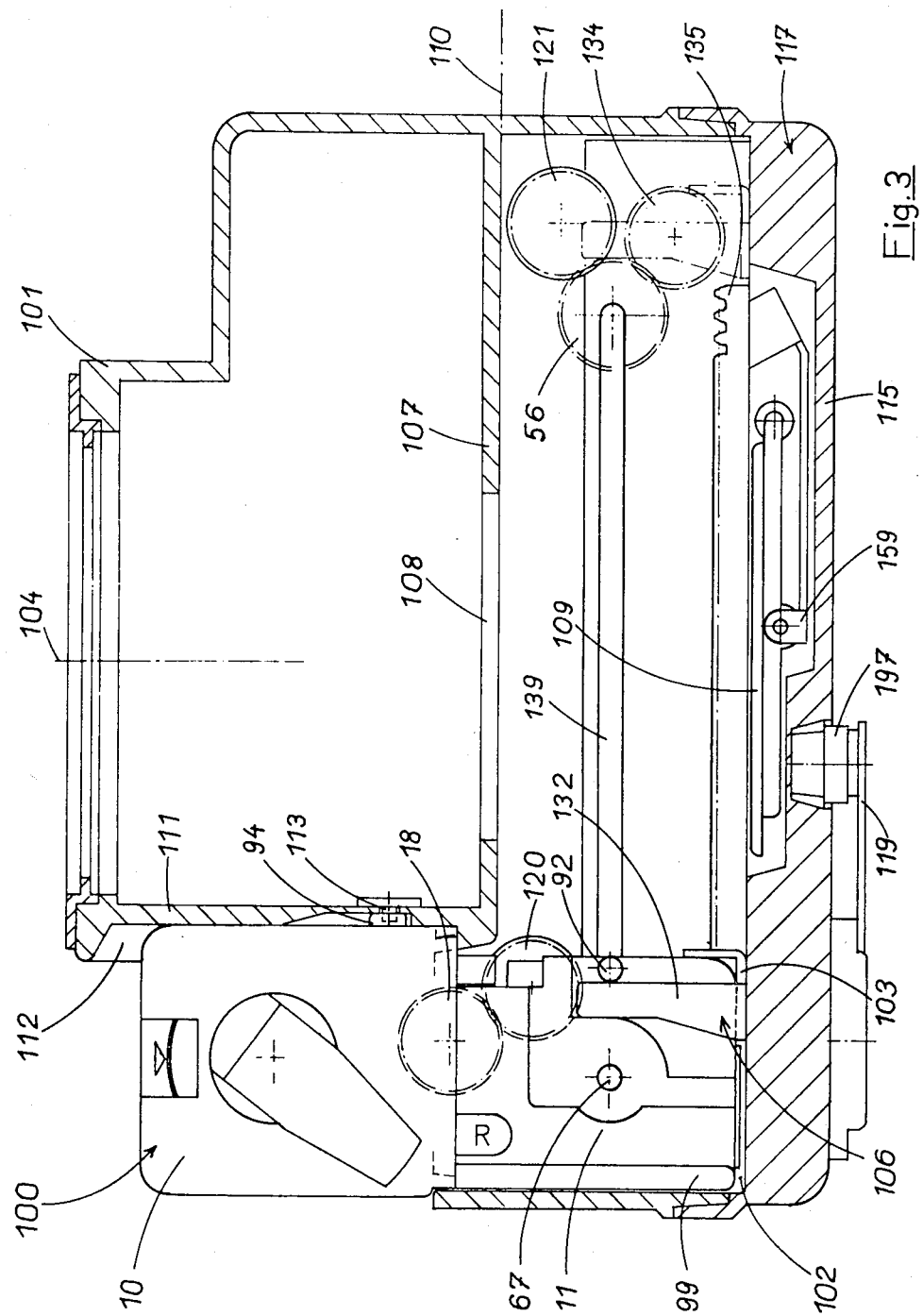

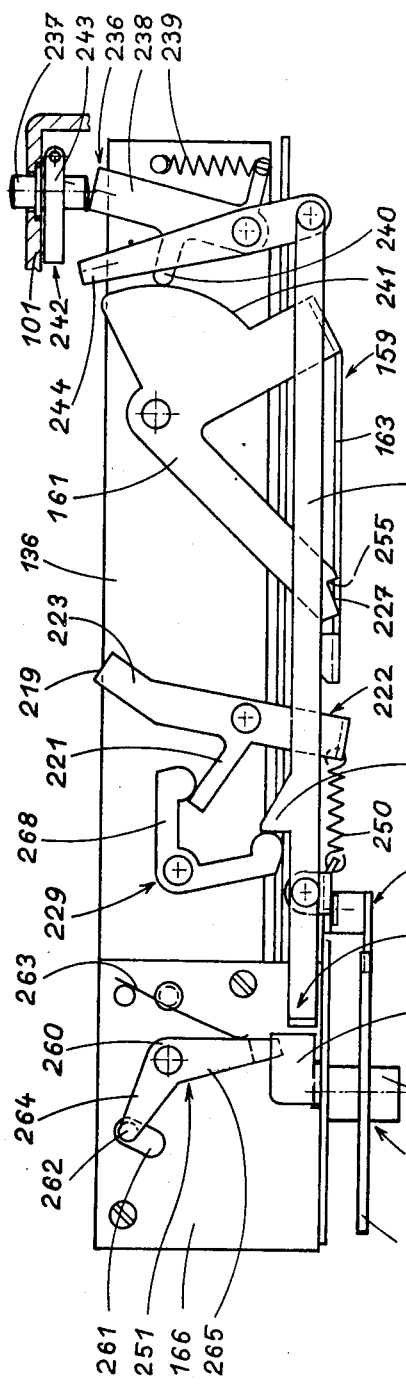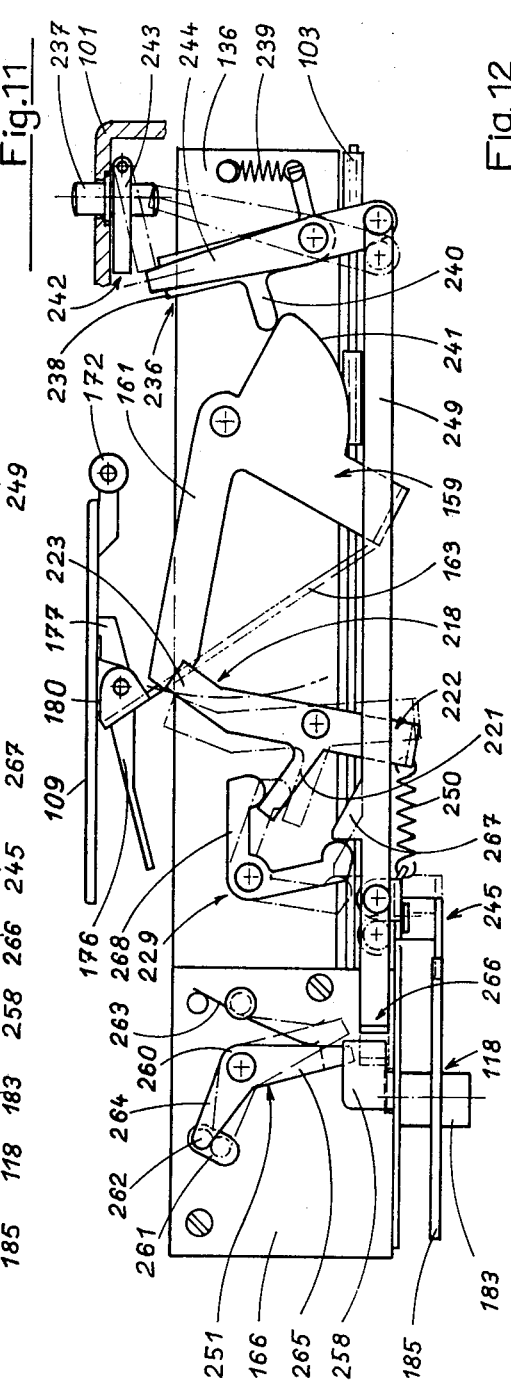

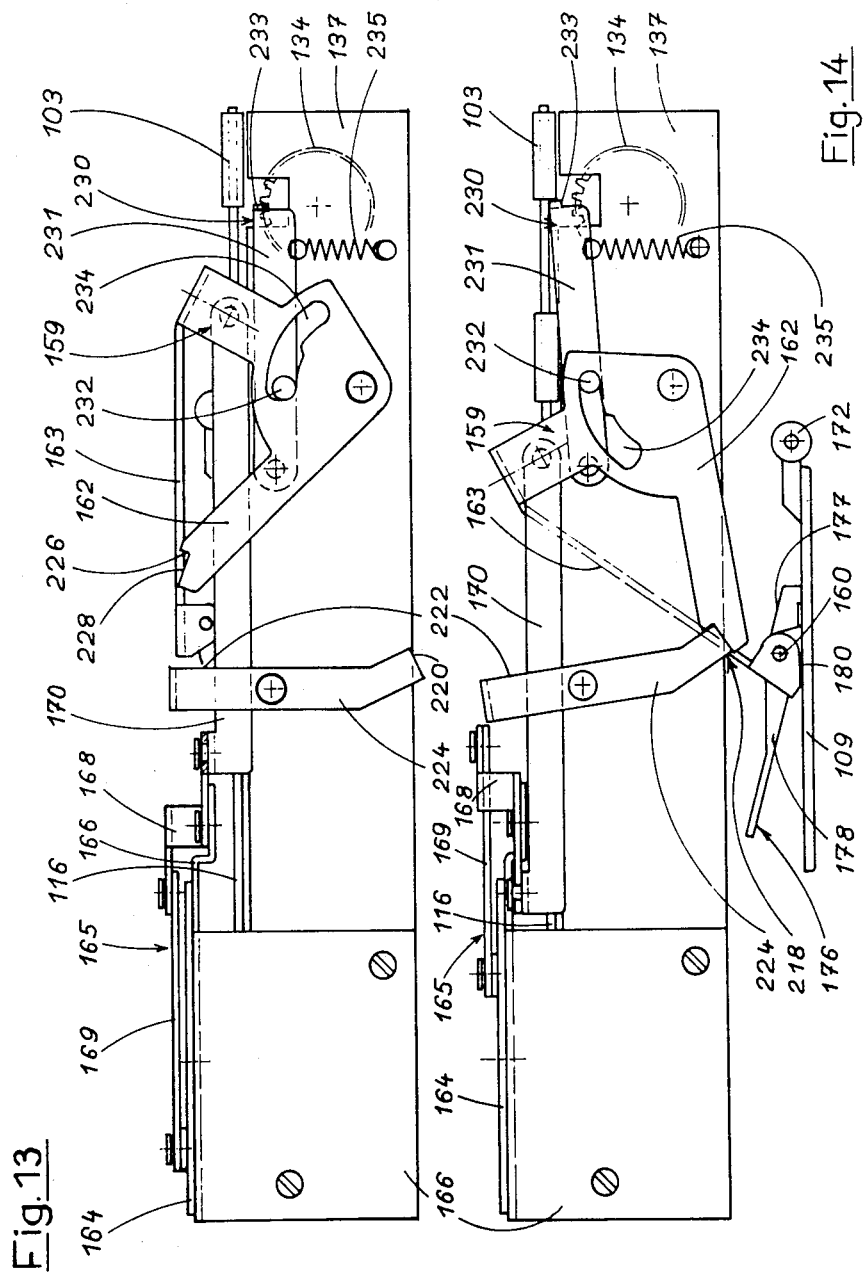

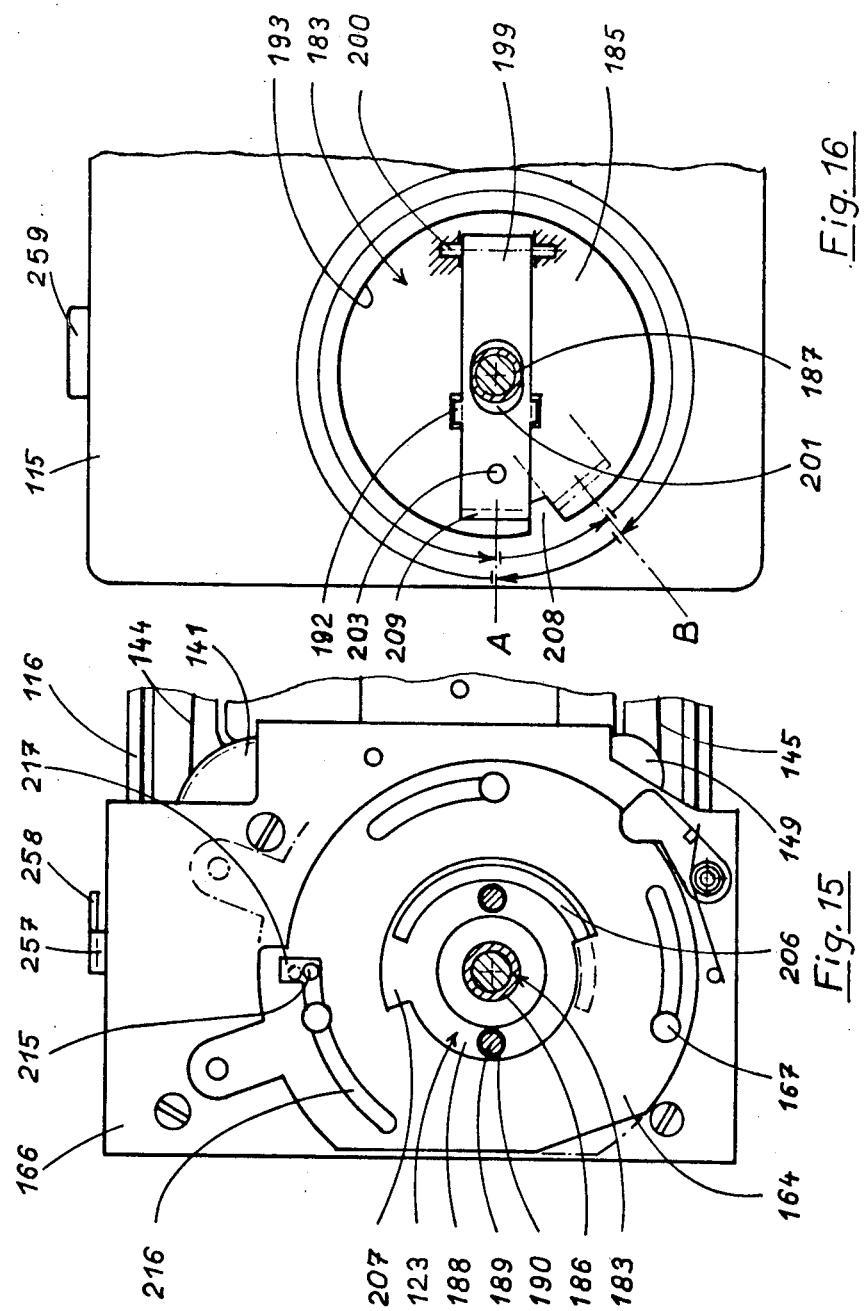

PHOTOGRAPHIC STILL CAMERA

BACKGROUND OF THE INVENTION

The invention relates generally to photographic still cameras having a housing provided with a laterally arranged cassette receptacle into which an exchangeable cassette unit assembled of a main cassette part and a detachable cassette part can be inserted whereby the main cassette part is held in position at the inlet of the cassette receptacle whereas the detachable cassette part is movable transversely to the optical axis by means of a sliding carriage movable behind a film framing platform in the camera housing and cooperating with a swingable film pressure plate.

The known still camera of this type employs exchangeable cassette units designed for a roll of film whereby upon insertion of the cassette unit into the cassette receptacle formed on the camera housing the detachable cassette part is engaged by an entrainment piece of a sliding carriage and by advancing the shutter cocking lever of the camera it is displaced past a film gate into its detached working position. In doing so, a certain length of the film strip is unwound from the film supply roll arranged in the cassette main part and this film length is stretched behind the film gate. The film gate is formed in a movable film pressure frame which, in order to permit the passage of the sliding carriage, is displaced forwardly in the direction of the camera objective and subsequently is returned to its initial position where it is depressed against a film pressure plate to hold the length of the film strip in the film plane. Upon the release of the shutter, the film pressure frame is again lifted from the film pressure plate to give way to the movement of the sliding carriage. The sliding carriage is simultaneously returned into its starting position in the cassette receptacle so that the detachable cassette part is reunited with the main cassette part. During this return movement, the film takeup spool which is arranged in the detachable cassette part is driven to rotate in the film feeding direction so that the length of the film which has been exposed during the preceding shutter release is wound on the film takeup spool. During the subsequent renewal of the picture shooting condition of the camera effected preferably by means of the shutter cocking lever, the aforedescribed process is repeated whereby during the travel of the sliding carriage toward its working position remote from the cassette receptacle, the rotation of the film takeup spool is arrested so that a new length of the film strip is unwound from the film supply spool in the main cassette part.

This known camera, due to its aforedescribed construction, is suitable exclusively for operation with roll films but is unsuitable for film strips of the picture format 24×36 mm, usually designated as small format films. In the case of roll films, the frame advance is indicated by marks such as numerals provided on the rear side of the film backing paper and thus the film length withdrawn from the film supply spool can be determined. In the aforedescribed known camera, the film framing platform formed by the film pressure frame and the film pressure plate is considerably offset in the direction of the incoming light behind the film deviation roller in the film cassette unit. In displacing the sliding carriage into its working position remote from the cassette receptacle, the film strip as mentioned above is withdrawn from the film supply spool in the main cassette part while the film takeup spool in the detachable cassette part is blocked. As a consequence, the film strip portion from the deviation roller to the takeup spool forms an acute relative to the optical axis in front of the film pressure plate. As a consequence, when the film pressure frame is applied against the film pressure plate, it can happen that an additional film section is withdrawn from the film supply spool when an exact planar position of the film at right angles to the optical axis of the film gate is being adjusted.

By contrast, in the case of small format films the picture frame advance is determined by a driven sprocket or perforation roller which engages with its sprockets into the perforations provided in the marginal portion of the small format film and, according to its predetermined number of rotations, withdraws a corresponding film length from the film supply spool. Provided that such a small format film be used in cassette units for the known camera, it would be necessary to replace the film deviation roller with the perforation roller. If, however, the sliding carriage should operate in the afaoredescribed manner, a corresponding drive would have to be provided for the perforation or sprocket roller in order to insure the intermittent advancement of the film frames. Even in this case, the film section stretched between the perforation or sprocket roller and the takeup spool would extend obliquely to the film pressure plate in the end position of the sliding carriage remote from the cassette receptacle. If, in this oblique position of the film strip, the film pressure frame is applied against the film pressure plate, the provision of a certain backlash would have to be made either in the perforation roller or in the film takeup spool in order to adjust the film in the film plane perpendicularly to the optical axis. The provision of such a backlash means not only a considerable increase in construction costs but also may cause inaccuracies in the positioning of the film section which in turn may cause, particularly during rapid succession of shots, that the consecutive exposed frames may overlap in their marginal zones.

Due to the above-described structural concepts of the known camera, it can be designed only as a viewer camera. Due to the spatial requirements necessary for the movement of the displaceable film pressure frame, it is impossible to design the conventional cameras of this type as single-lens reflex cameras. Furthermore, the prior art cameras do not exclude the possibility of an incorrect manipulation, for example, the removal of the cassette main part from the receptacle while the detachable cassette part is in its remote position and consequently considerable inconveniences may result.

SUMMARY OF THE INVENTION

It is, therefore, a general object of the present invention to overcome the aforementioned disadvantages.

More particularly, it is an objective of the invention to provide an improved photographic still camera of the aforedescribed type, which is suitable for use in connection with exchangeable film cassette units loaded with small format films.

Another objective of this invention is to provide such an improved camera which, without any construction changes in its film feeding mechanism, is suitable for being designed not only as a viewfinder camera but also as a singlelens reflex camera.

An additional objective of the invention is to provide such an improved camera which has a compact configuration, reduced size and which is easy to manufacture.

A further objective of the invention is to facilitate cleaning of the interior of the camera, for example, of the film framing platform and the film pressure plate by the camera user himself.

Furthermore, another objective of this invention is to exclude the possibility of incorrect manipulation.

In keeping with these objects, and others which will become apparent hereinafter, one feature of the invention resides in a photographic still camera having a housing formed with an aperture for an objective centered about an optical axis, comprising an exposure framing platform fixedly mounted in the housing in a film plane extending at right angles to the optical axis, the framing platform having a film gate aligned with the objective aperture, a film cassette receptacle formed in an outer lateral wall of the housing and communicating with the interior of the housing behind the framing platform when considered in the direction of incoming light, the receptacle being designed for receiving a bipartite film cassette assembled of a main cassette part and a detachable cassette part, a cassette guiding track provided in the interior of the housing behind the framing platform and including means directed transversely to the optical axis, a sliding carriage guided on the guiding means to move between a starting position in the receptacle and a working end position past said film gate, said carriage including at least one entrainment piece engageable with the detachable cassette part to carry the same between the starting position and the end working position, and a film pressure plate arranged behind the guiding track and being operable for movement in the direction of the optical axis to abut against the film gate.

By virtue of the specific measures of this invention, the film framing platform extends substantially tangentially to the effective periphery of the sprocket roller so that during the compression of the film pressure plate against the film gate the withdrawal of an additional length of the film strip from the supply spool is no longer necessary for achieving an exact alignment of the film length between the sprocket roller and the film takeup spool in the film plane which, as explained before, is formed by the stationary framing platform directed perpendicularly to the optical axis. Because of the predetermined drive of the sprocket roller to rotate about a fixed number of rotations, the film length withdrawn from the supply spool in the cassette main part during one advancing step is always placed a predetermined distance from the following length and any overlapping of exposed film frames in no longer possible.

Furthermore, the camera of this invention can be designed as a single-lens reflex camera inasmuch as all driving parts are arranged behind the film plane determined by the framing platform. The space which is available between the film plane and the camera objective can be, therefore, fully utilized for accommodating the deviating mirror. The conceptual measures of the camera of this invention create prerequisites for space-saving design resulting in a relatively small configuration of the camera. Moreover, from the manufacturing point of view, the camera of this invention is very advantageous and also the maintenance of the camera is considerably simplified so that the cleaning of the framing platform and of the film pressure plate inside the camera housing can be made by the camera user himself.

A particularly advantageous modification of the camera of this invention is in the provision of a detachable rear wall of the camera housing which supports the cassette guiding track including the guiding means together with the sliding carriage, the film pressure plate and actuation means for the carriage and the film pressure plate. By this means, it is possible by simple unlocking of the rear wall to obtain problem-free access to the film framing platform without touching in any way the film feeding mechanism. In this simple manner, the camera user can, from time to time, make all necessary cleaning without resorting to professional services as has been hitherto necessary in conventional camers operating with exchangeable bipartite cassettes. At the same time, the camera of this invention is very advantageous from the point of view of the manufacturing technology inasmuch as the rear wall of the housing together with the film pressure plate, the guiding means for the sliding carriage, the sliding carriage itself and the actuation means for the carriage and the film pressure plate can be completely designed as a single modular unit and as such installed in the camera body. This possibility substantially shortens the manufacturing and installation time and, in addition, renders the possibility for additional changes in the configuration of the camera because only the dimensions of the rear wall of the housing set the limits for the shape and configuration of the rest of the camera. For this reason, it is possible to design many modifications of this type of the camera all having only one common structural unit, namely the rear wall of the housing. As a consequence, the quantity of modular rear wall units can be considerably increased in a series production and consequently, manufacturing costs per unit can be substantially reduced.

In another advantageous modification of this invention, the removable rear wall of the housing has a cup-shaped configuration and includes a base plate extending transversely to the optical axis and supporting the aforementioned guiding means, the sliding carriage, the film pressure plate and the actuation means for the carriage and the pressure plate. The provision of such a base plate enables that the design of the rear wall proper can be adjusted to the remaining part of the camera housing without changing the construction of the functional parts of the "rear wall unit" which in the following will be called rear wall module.

Of particular advantage is also the embodiment in which the actuation means for the sliding carriage and for the film pressure plate include a common control mechanism actuated by a common driving member to impart in a predetermined sequential order the requisite movements to the sliding carriage and to the film pressure plate. The driving member for the control mechanism is preferably a hand-operated crank arm controlled independently from a conventional cocking or advancing lever for actuating film feeding and shutter cocking mechanism of the camera. These measures enable the so-called rapid advance of the cocking lever as it is generally required in modern high-performance cameras. In a camera of this invention, by contrast to the conventional camera of this type as it has been described before, it is no longer necessary to keep returning the sliding carriage from its working position remote from the cassette receptacle into its starting position in the cassette receptacle after each release of the shutter. Instead, the sliding carriage remains in its extended working position outside the cassette receptacle until an exchange of the cassette unit is desired. In other words, as soon as the sliding carriage is extended into its working position within the camera housing, the film feeding and the shutter cocking is made by activating the cocking or advancing lever as usual in conventional small format film cameras. Accordingly, the camera of this invention is capable of operating with the same speed and the same application of force against the cocking lever as do conventional small picture format cameras to return after a picture has been taken into its ready to shoot condition.

In another advantageous modification of the camera of this invention, the housing is formed with a recess communicating with the inlet of the cassette receptacle and being adapted to accommodate the cassette main part; the inner wall of the cassette receptacle is formed with two juxtaposed guiding shoulders and the film cassette unit is formed with corresponding guiding projections cooperating with the guiding shoulders to facilitate the introduction of the cassette into the receptacle. This recess has for its purpose the reduction of the size of the camera in the direction perpendicular to its optical axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a sectional top view of the camera of FIG. 2 taken along the line III—III and shown with an inserted cassette unit in its united starting position;

FIG. 11 is a top view of the rear wall module of FIG. 9;

FIG. 12 is a view similar to FIG. 11, shown with the swung up film pressure plate;

FIG. 13 is a bottom view of the rear wall module of FIG. 9;

FIG. 14 is a view similar to FIG. 13 but shown with the swung up film pressure plate;

FIG. 15 is a rear view of a cut away portion of the rear wall module of FIG. 7 taken along the line XV—XV; and FIG. 16 is another sectional view of FIG. 7 taken along the line XVI-XVI.

DESCRIPTION OF THE PREFERRED EMBODIMENTS

Figure 2:
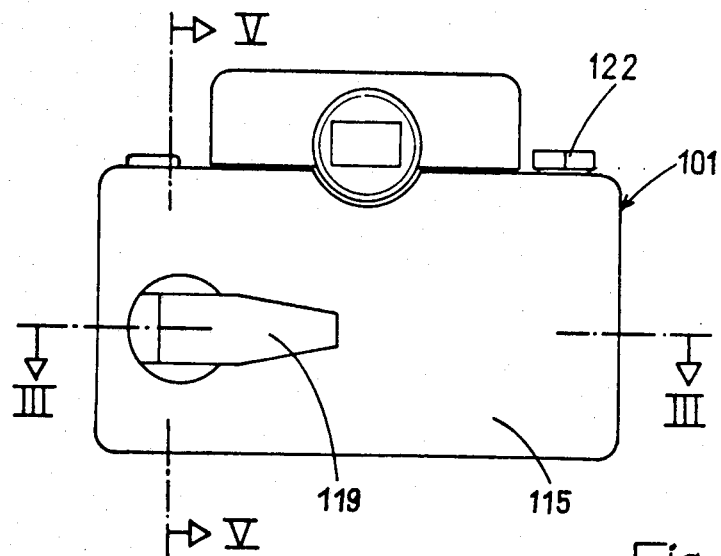
FIG. 2 is a rear view of the camera of FIG. 1.
Figure 1:
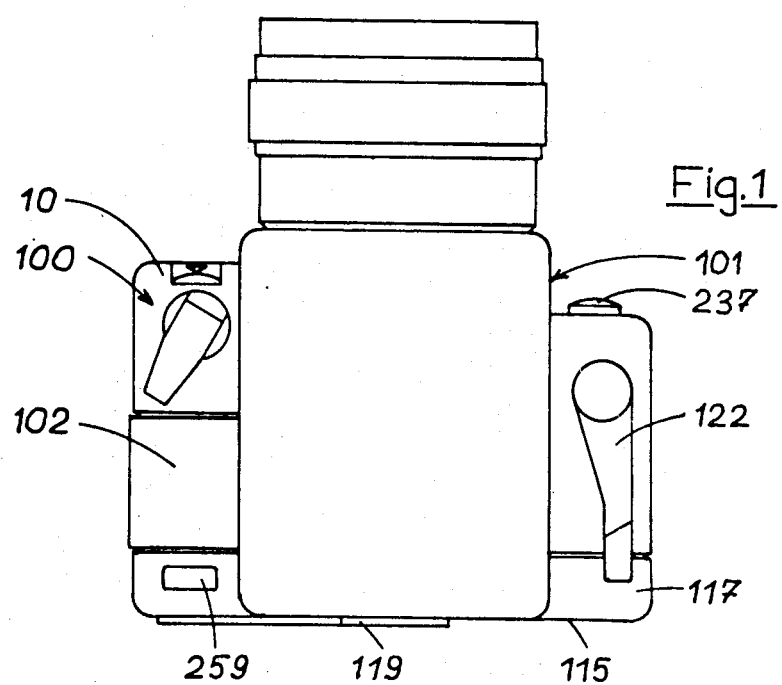
FIG. 1 is a top view of a photographic still camera provided with a cassette receptacle with an inserted exchangeable film cassette unit.

Referring firstly to FIGS. 1 and 2, depicting the outer configuration of the photographic still camera of this invention, in this an example of a single-lens reflex camera, the camera has a housing 101 provided with an objective aperture in its front wall and with a cassette receptacle formed in a lateral wall. The cassette receptacle serves for accommodating an exchangeable cassette 100. The cassette unit is assembled of a cassette main part 10 and a detachable cassette part 11. The cassette unit 100 applicable for use in the camera of this invention has been described in detail in the copending patent application corresponding to the German patent application No. P 29 25 496.4.

Figure 4:
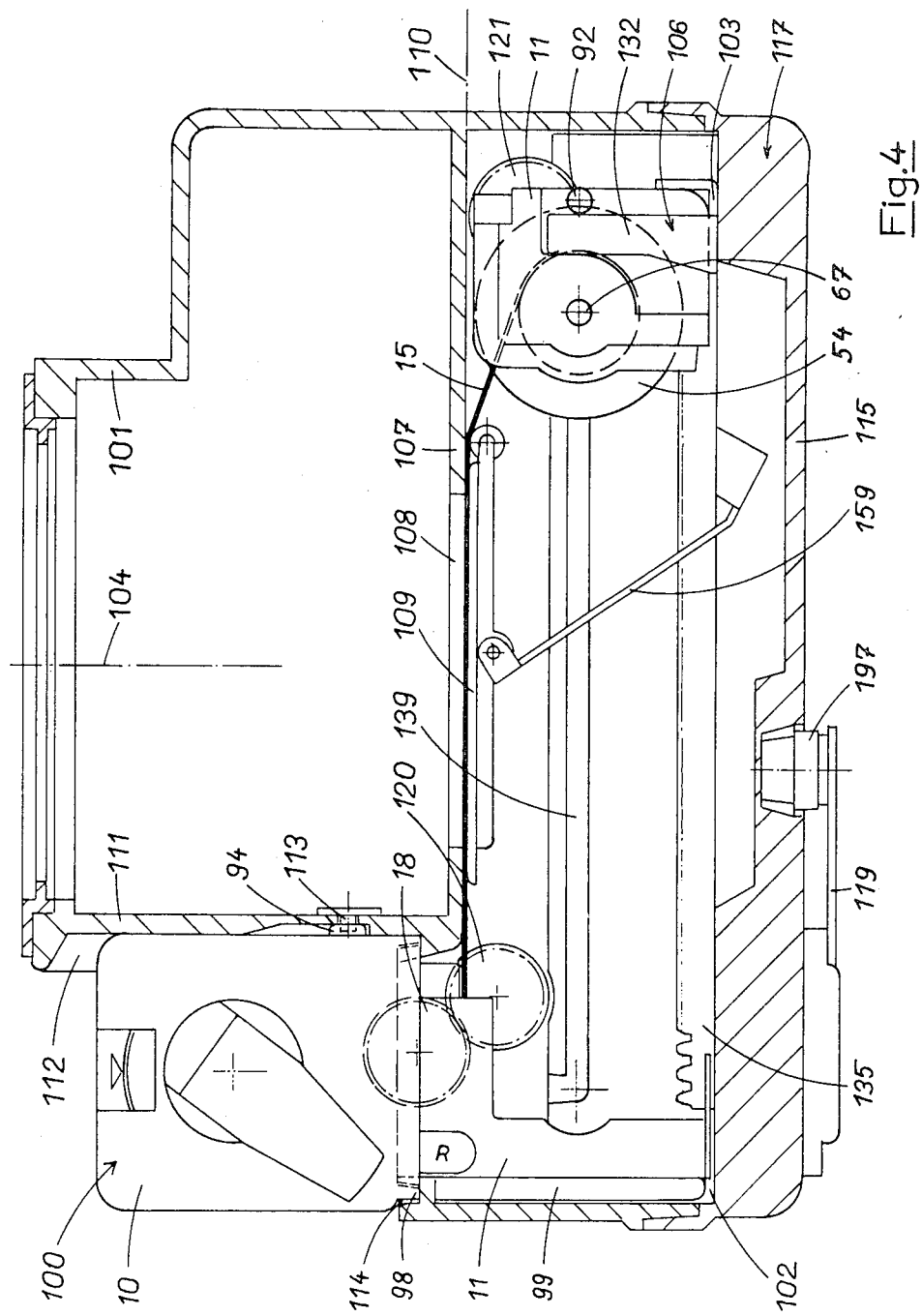
FIG. 4 is a view similar to FIG. 3 showing the detachable cassette part in its working end position with actuated film pressure plate.

As seen particularly from FIGS. 3 and 4, the interior of the housing 101 is divided by a stationary film framing platform 107 into a front space communicating with the opening for the camera objective and being suitable for accommodating the deflection mirror of the single-lens reflex camera. The rear space behind the platform 107 when viewed in the direction of incoming light along the optical axis 104 accommodates a cassette guiding track 105 in which a sliding carriage 103 is movable in two opposite directions transversely to the optical axis 104. The sliding carriage 103 is provided with cassette entrainment member 106 which engages the detachable cassette part 11 and carries the same on the sliding carriage 103. In the starting position of the carriage in the cassette receptacle 102, the detachable cassette part 11 is united with the main cassette part 10, thus forming the exchangeable cassette unit 100 (FIG. 3). In the working end position of the sliding carriage 103 remote from the carriage receptacle 102, the detachable cassette part 11 is displaced to the opposite end of the guiding track 105 whereby a length of film strip 15 is unwound from the film supply spool in the main cassette part 10 and stretched transversely to the optical axis 104 across the film gate 108 in the framing platform 107 (FIG. 4). In this manner, the film strip 15 lies partially on the rear surface of the platform 107 which is fixedly mounted in the housing 101 and extends in the film plane 110. The framing platform 107 cooperates with a film pressure plate 109 which is normally folded in the rear wall 115 of the housing. In this manner, film pressure plate 109 can be removed from the film gate 108 when the sliding carriage 103 travels along a film feeding channel extending in the direction transverse to the optical axis 104 behind the film framing platform 107. In a camera of this invention, therefore, the film gate is stationary relative to the housing 101 and only the pressure plate 109 is movable in the direction of the optical axis. The slide carriage 103 for the detachable cassette part together with its guide 105 are arranged behind the film plane 110 when considered in the direction of incoming light.

The lateral wall 111 of the housing 101 adjoining the cassette receptacle 102 is formed with a retaining recess 112 fitting the cassette's main part 10. A film sensitivity feeler 113 projects from the interior of housing 101 into the recess 112 to automatically probe the adjustment of a film sensitivity indicator arranged on the facing lateral wall of the main cassette part 10. The film sensitivity feeler 113 is connected to a non-illustrated exposure control circuit and adjusts the same according to the detected film sensitivity.

The inlet opening of the cassette receptacle 102 which is directed forwardly, that means in the direction of the camera objective, is entirely delimited by rim groove 114 engageable with a corresponding web or rib formed on the main cassette part 10 so when the cassette unit 100 is inserted into the recess 112 and into the receptacle 102, the groove 114 with the rib on the cassette part 10 form together a light-tight labyrinth-like seal.

Figure 5:
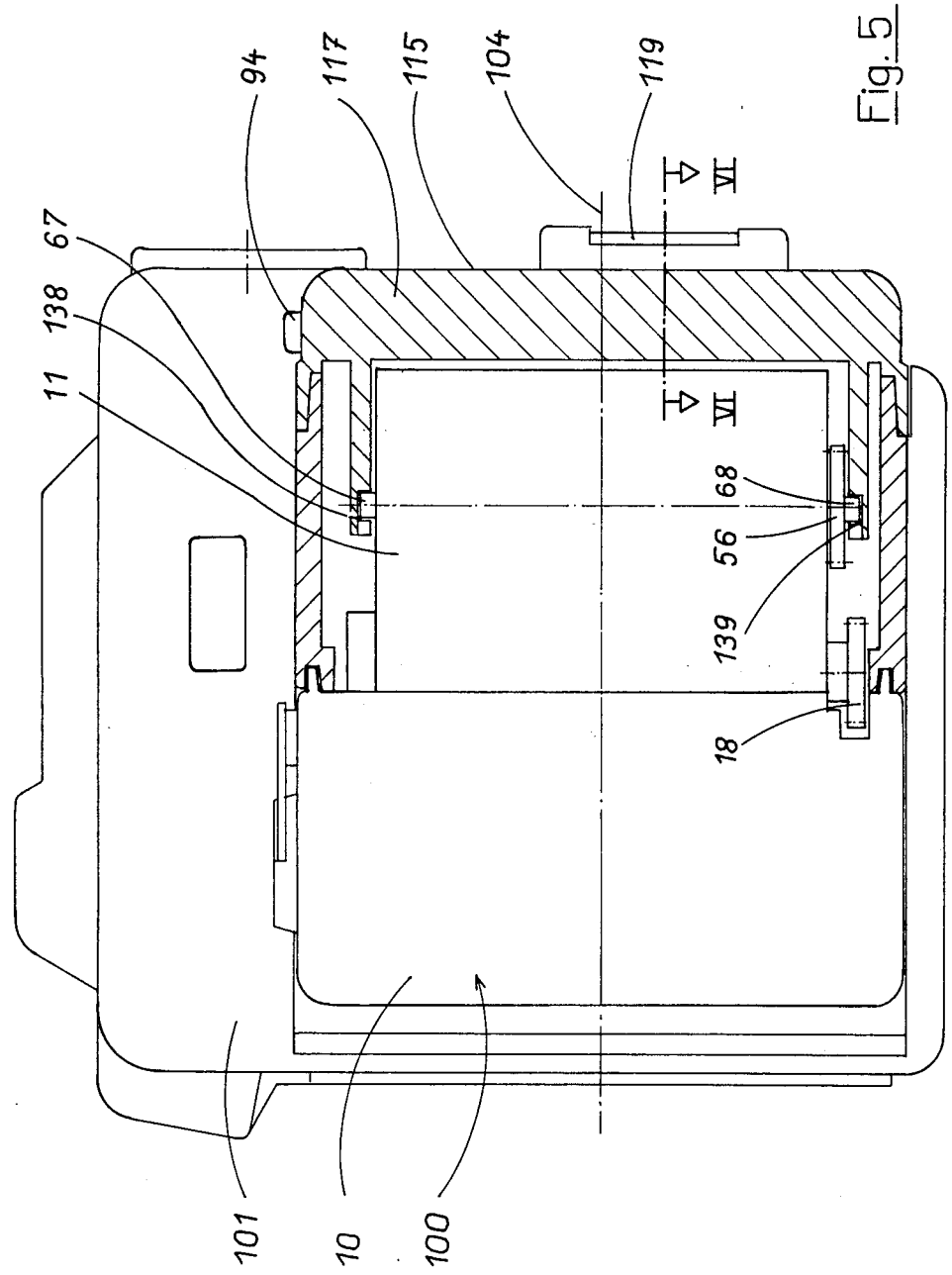
FIG. 5 is a sectional side view of the camera of FIG. 2 taken along the line V—V with a film cassette unit in its starting position.
Figure 6:
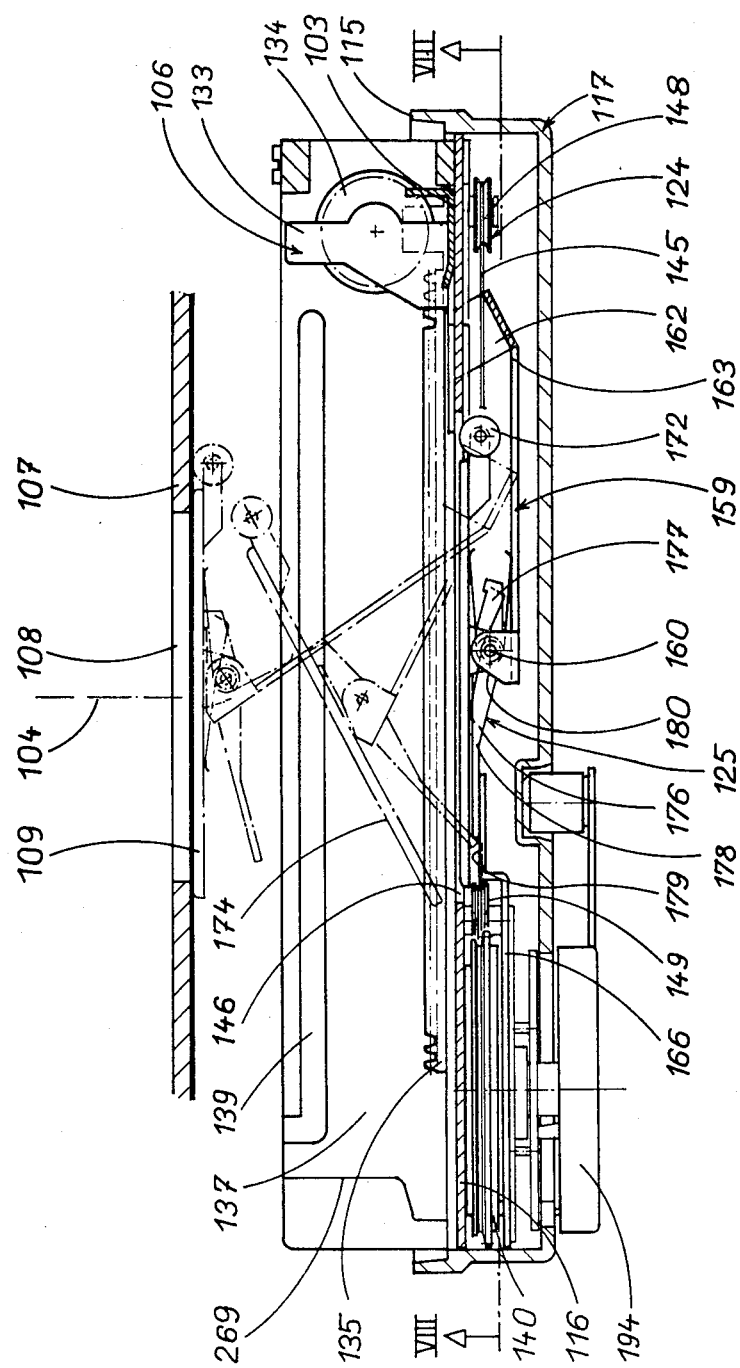
FIG. 6 is a sectional top view of a rear wall module and of a cut away portion of the film framing platform, taken along the line VI—VI in FIG. 5.
Figure 7:
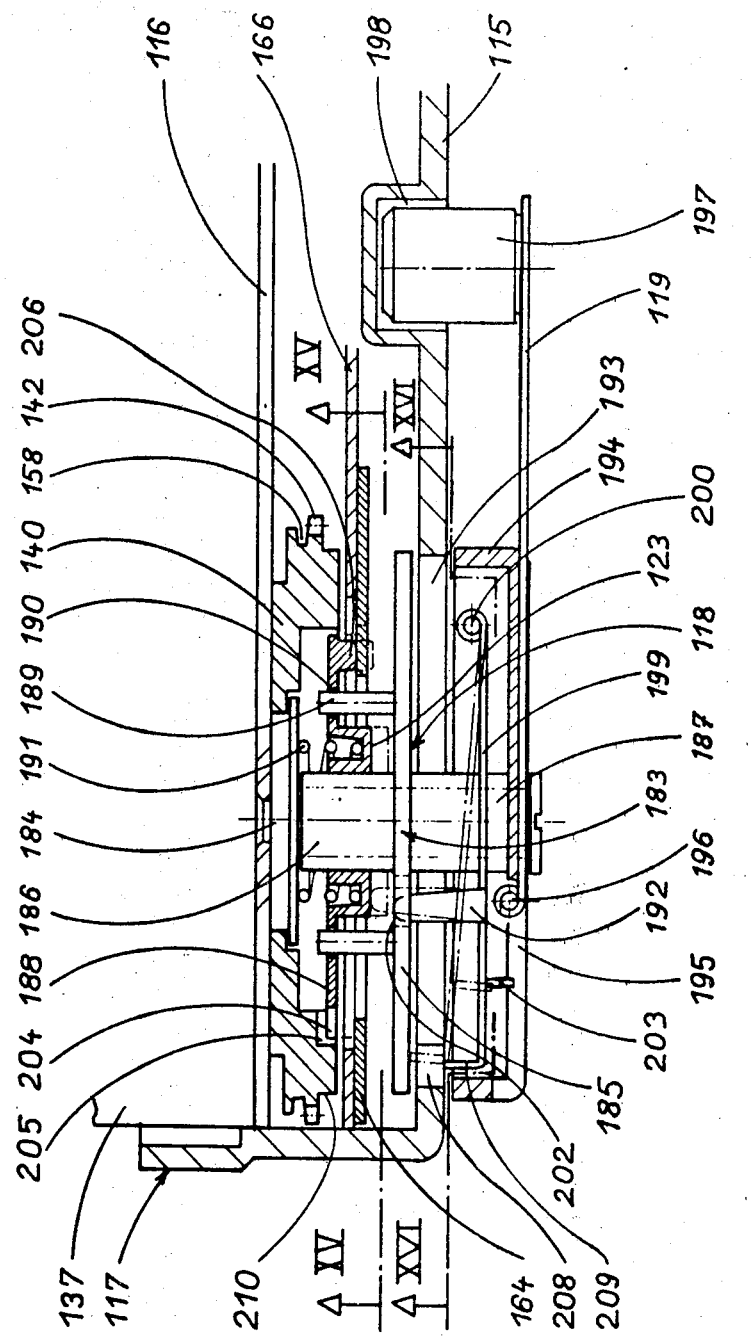
FIG. 7 is a cut away view, on an enlarged scale, of the left-hand part of the rear wall module of FIG. 6.
Figure 8:
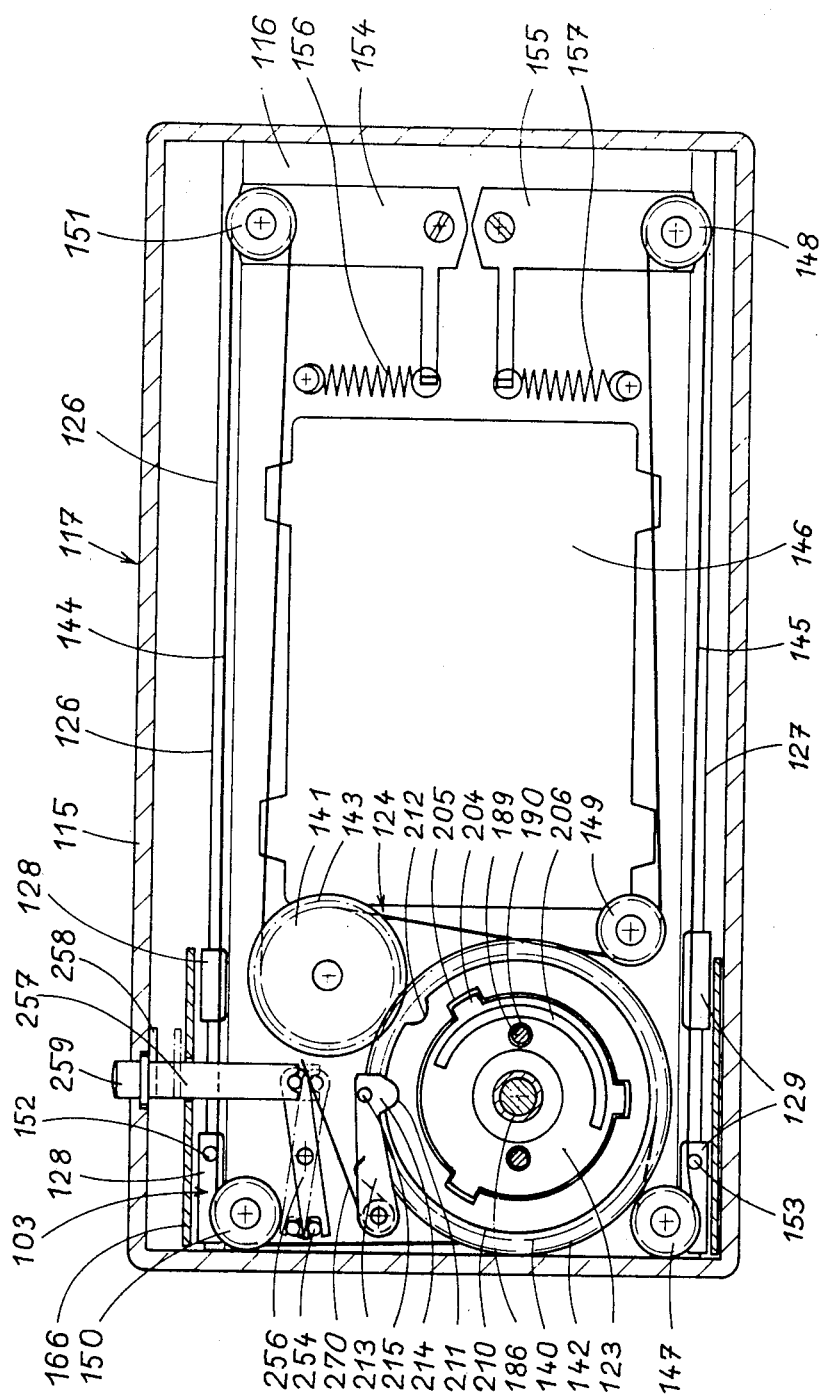
FIG. 8 is a sectional rear view of the rear wall module of FIG. 6, taken along the line VIII—VIII and shown without a film pressure plate.

Referring now to FIGS. 3–5, housing 101 includes a removable rear wall 115 which supports the guiding means 105 for the sliding carriage, the film pressure plate 109 as well as actuation or driving means for the carriage and the pressure plate as it will be described below. As illustrated in FIGS. 6–8, the rear wall 115 of the camera housing has a cup-shaped configuration and is bridged by a base-plate 116 which is formed by guides 105 for the sliding carriage and supports the film pressure plate 109 as well as the actuation means for the carriage and the pressure plate. The rear wall 115 together with the base-plate 116 and the aforementioned functional units, that is, guides 105, pressure plate 109 and the actuation means for the latter, form a single structural unit which is manufactured and assembled independently from the housing 101. This structural unit in the following description will be defined as "rear wall module" 117. In the assembled camera, the rear wall module 117 can be readily removed from the housing 101 so that film framing platform 107 with its film gate 108 is freely accessible and can be cleaned by the camera user.

The actuation of driving means for the sliding carriage and the film pressure plate includes a common central control means 118 which, as indicated in FIGS. 6 and 7, controls in a predetermined time sequence the relative movements of the sliding carriage 103 and of the film pressure plate 109. The control means 118 is connected to a driving member which, in this example, is in the form of a hand-operated crank 119.

Two driving gears 120 and 121 (FIGS. 3 and 4) are coupled via a non-illustrated film-feeding and shutter-cocking mechanism of a conventional design to an actuation lever 122 (FIG. 1 and 2) on the camera housing. One driving gear 120 is engageable with a gear 18 arranged on the main cassette part 10 which in turn is coupled to a non-illustrated sprocket roller rotatably mounted in the main cassette part 10 to engage the perforation of the film strip. The other driving gear 121 is arranged at the end position of the sliding carriage remote from the cassette receptacle and is engageable with a gear 56 arranged on the detachable cassette part 11 when the latter part is displaced by the sliding carriage into this other end position. The gear 56 is coupled to film take-up spool 54 provided in the cassette part 11 as indicated by dashed lines in FIG. 4. The gears 18 and 56 are situated at the bottom side of the cassette 100 and in FIGS. 3 and 4 are, for the sake of clarity, indicated by dash and dot lines.

The control member 118 further includes a coupling 123 which, in predetermined sequence, connects the hand-operated crank 119 alternately with a driving mechanism 124 for the sliding carriage (FIG. 6) and with a control drive 125 for displacing the film pressure plate 109 in the direction of the optical axis 104. The driving crank 119, the control member 118, together with its coupling 123, driving mechanism 124 for the sliding carriage, and the control mechanism 125 for the film pressure plate are designed so as to be spatially separated and fully disconnectable from the camera actuation lever 122, that means, from the film-feeding and/or shutter-cooking mechanism.

Figure 10:
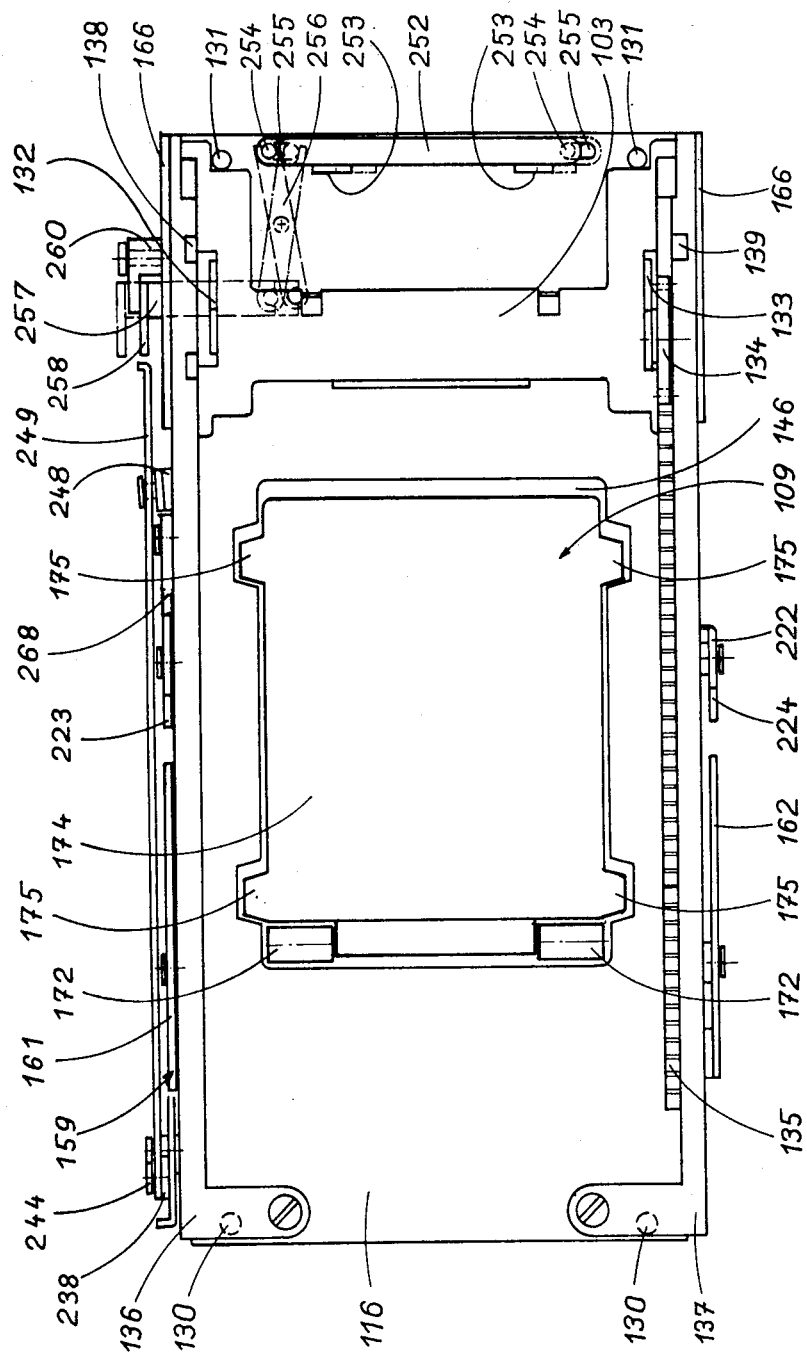
FIG. 10 is a front view of the base plate of FIG. 9.

As it can be seen, particularly from FIGS. 8 and 10, the guides 105 for the sliding carriage are formed by the upper and lower longitudinal edge 126 and 127 of the base-plate 116 in the rear wall module 117. The carriage 103 has the form of a flat slider bridging the front surface of the base-plate 116 facing the film gate 108 and its lateral edges are formed with angular projections 128 and 129 of a U-shaped cross-section which overlap and slidably embrace the guiding edges 126 and 127 of the base-plate 116. Both end positions of the carriage 103 are defined by two pairs of end-stops 130 and 131 (FIG. 10).

The entraining piece 106 for engaging the detachable cassette part 11 projects forwardly from the carriage 103 and is formed with two arms 132 and 133 extending at right angles to the base-plate 116 to embrace the opposite sides of the detachable cassette part 11. The entrainment arms 132 and 133 abut against a carrying pin 92 on the cassette part 11 (FIGS. 3 and 4) and thus rigidly connect the carriage 103 to the latter. The lower entrainment arm 133 supports for rotation a driving gear 134 which is engageable with the gear 56 on the detachable cassette part 11. As it has been mentioned before, the gear 56 is coupled to the take-up spool 54 in the cassette part 11 (FIGS. 3 and 6).

A tooth rack 135 is mounted on the base-plate 116 and extends parallel to the guiding edges 126 and 137 forming the guides 105 for the sliding carriage 103. The gear 134 on the lower entrainment arm 133 is engageable with the teeth of the rack 135 whereby the length of the rack is adjusted so that the gear 134 is in mesh with the rack 135 when the sliding carriage is in its end position in the cassette receptacle, whereas in the other position remote from the cassette receptacle the gear 134 is disengaged from the rack. By this means, it is ensured that in the latter position of the carriage 103, the gear 134 is permitted to idle when the gear 56 connected to the take-up spool is driven via the driving gear 121 by the camera actuation level 122.

The base-plate 116 further supports brackets or guide strips 136 and 137 attached to the base-plate in the proximity of its longitudinal guiding edges 126 and 127 (FIGS. 6 and 10). Each guiding strip 136 and 137 extends along the entire length of the base-plate 116 and are provided respectively with guiding grooves 138 and 139 for guiding the ends 67 and 68 of the shaft of the film take-up spool 54 arranged in the detachable cassette part 11. In this manner, in addition to the guiding edges 126 and 127, the cassette part 11 is also guided in the guiding grooves 136 and 137.

The driving or power transmission mechanism 124 for the sliding carriage is mounted on the rear side of the base-plate 16 adverse from the film-framing platform 107 (FIG. 8). This carriage driving mechanism includes two winding-up discs or drums 140 and 141, provided with gear rings 142 and 143 in mesh with one another so that the winding drums are permanently engaged. The gear rings 142 and 143 are illustrated in FIG. 8 by dash and dot lines. Ends of two drawstrings 144 and 145 are attached to respective winding rollers 140 and 141. The drawstring 145 is guided by means of deviation rollers 147, 148 and 149 below the lower edge of a cutout 146 in the base-plate 116 for passing through the film-pressure plate 109, and is attached at its other end to the winding drum 141. The other drawstring 144 extends from the winding drum 140 past deviation rollers 150 and 151 above the cutout 146 and is also attached at its other end to the winding drum 141. Both drawstrings 144 and 145 between the deviation rollers 147, 148 and 150, 151 are attached to the sliding carriage 103. In this embodiment, the upper drawstring 144 is attached to a binding pin 152 on the lower surface of the angular sliding piece 128 and the lower drawstring is attached to a similar binding pin 53 on the opposite guiding piece 129. The arrangement of the drawstrings 144 and 145 in the close proximity to guiding edges 126 and 127 for the sliding carriage 103, and the attachment of these strings to the binding points 152 and 153 located on the parts 129 of the carriage 103 enable the flat configuration of the rear wall module 117, on the one hand, and simultaneously ensure the miminum tilting movement of the carriage 103. The deviation rollers 148 and 151 are mounted on separate supporting pieces 154 and 155, which are pivotally mounted on the base-plate 116 and biassed in the tightening direction for the drawstrings 144 and 145 by means of tension springs 156 and 157. The diameters of respective winding drums 140 and 141 are designed so that when the sliding carriage travels from one position to the other, that means, from one end stop pair 130 to the other end stop pair 131 and vice versa, there always is wound up or unwound a slightly larger length of the drawstring than the length of the path travelled by the sliding carriage 130. This measure, together with the arrangement of deviation rollers 148 and 151 on the spring-biassed rotatable pieces 154 and 155, has the essential advantage that the tensioning springs 156 and 157 in the end positions of the sliding carriage 103 are additionally loaded and consequently the carriage 103 is compressed by the increased spring force against the end stops 130 or 131. As a consequence, an exact positioning of the sliding carriage 103 against the respective end stops is achieved without any additional adjusting devices for controlling the operation of the drawstrings.

In the aforedescribed driving mechanism 124 for the sliding carriage, the two drawstrings 144 and 145 have rectangular cross-sections with a low height, that means with a low radial dimension of the string layer wound up on respective winding drums 140 and 141. The end portions of respective drawstrings are guided one above the other in a recessed guiding groove 158 (FIG. 7) formed at the center line of the periphery of respective winding drums 140 or 141 immediately below the teeth of the outer gear rings 142 and 143, and thus permitting a flat configuration of the entire driving mechanism 124. Naturally, it is also possible to employ drawstrings of a circular cross-section. In the latter case, however, it would be necessary to use two separate guiding grooves 158 arranged side by side on each winding drum to accommodate an assigned drawstring. As a consequence, the thickness of the driving mechanism 124 for the carriage would be slightly increased in the direction of the optical axis.

Figure 9:
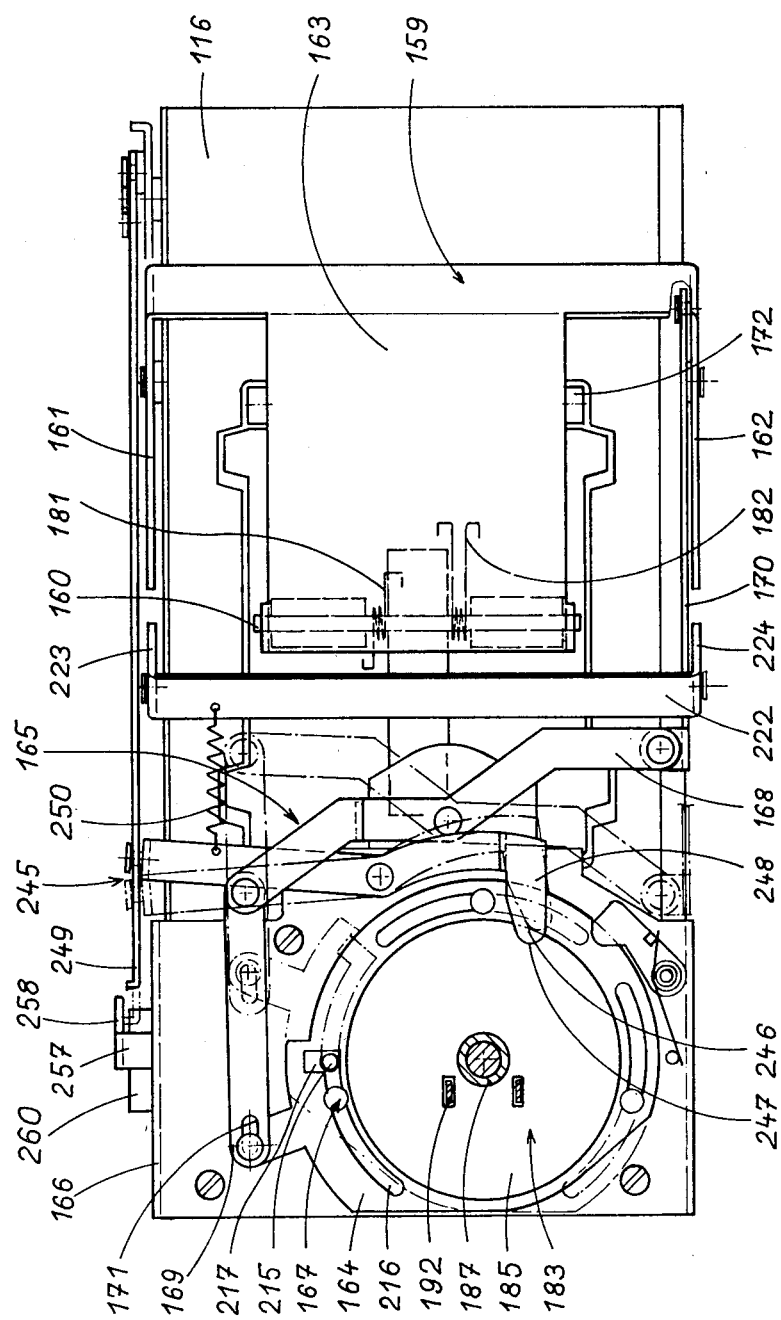
FIG. 9 is a rear view of the base plate in the rear wall module illustrated without actuation means for the sliding carriage.

The film pressure plate 109 is hinged on a pivot axle 160 mounted on a swinging arm 159 (FIGS. 6 and 9). The swinging arm 159 has a yoke-shaped configuration extending over the entire width of the rear surface of the base-plate 16 and overlaps with its two lateral projections 161 and 162 the two guiding strips 136 and 137. The two overlapping projections 161 and 162 are pivotally mounted on the assigned guiding strips 136 and 137 (FIGS. 11–14). The rear surface of the base-plate 116 is remote from the film gate 108, the swinging yoke 159 is connected to a plate 163, the free end of which supports the pivot axle 160 for the pressure plate 109 (FIG. 9). The control mechanism 125 for the film pressure plate includes a rotatable ring 164 and a lever linkage 165 coupling the rotary ring 164 to the swinging yolk 159 in such a manner that an angular displacement of the rotary ring 164 is transformed into a swinging movement of the yoke 159 (FIG. 9). The rotary ring 164 is rotatably mounted by means of pin-slot guides 167 on a metal sheet base 166 secured to the rear surface of the base-plate 116 (FIGS. 6, 7 and 9). The linkage 165 includes a two-arm lever 168 pivotally mounted on the metal sheet 166 and being hinged at its respective arms to links 169 and 170. The link 169 is hinged via a pin-slot connection 171 to the rotary control ring 164, whereas the link 170 is hinged to the swinging yoke 159 for the pressure plate.

The film pressure plate 109 supports at the edge thereof remote from the cassette receptacle a film strip deviating roller 172 which is supported for rotation on the pressure plate in such a manner that its circumferential points abut against the frame platform in the film plane 110 when the film pressure plate 109 is in its swung-up position adjoining the framing platform 107. As illustrated in FIG. 10, the film pressure plate abuts against the framing platform 107 with its four lateral projections 175 which exceed the perimeter of the film gate 108. The thickness of these lateral projections 175 is dimensioned such that upon abutment against the film framing platform, a narrow gap is left between the working surface of the pressure plate 109 and the film guiding surface of the platform 107, permitting the feeding movement of the film strip 15.

The rotary ring 164, ring guage 165 and the swinging yoke 159 transmit the driving impulse to the film pressure plate 109 for displacing the same from its rest position illustrated in FIGS. 6, 11 and 13 in which it is located behind the base-plate 116 when considered in the direction of the incoming light, into its swung-up working position in which it is pressed against the film framing platform 107 (FIGS. 6, 12 and 14). The swinging movement of the pressure plate 109 takes place in the direction of the optical axis 104. The control mechanism 125 for the film pressure plate thus imparts to the latter successive movements during which the edge of the pressure plate supporting the film deviating roller 172 is first slightly turned toward the pivot axle 160, and thereupon is turned in opposite direction towards the film framing platform 107 so that the film deviating roller 172 leads the pressure plate 109 which, during this forward movement, is slightly inclined towards the optical axis 104. As a result, it is the film deviating roller 172 which first contacts the film strip 15 and compresses the same against the film framing platform 107. In order to produce this combined movement of the film pressure plate 109, the control mechanism 125 includes a two-arm control lever 176, which is also supported for rotation on the pivot axle 160 to engage the rear side of the film pressure plate when considered in the direction of the incoming light. The control lever 176 has a shorter arm 177 directed toward the film deviating roller 172, and being provided at its end with a low projection directed against the pressure plate, and a longer arm 178 (FIGS. 6, 12 and 14). In the rest position behind the base-plate 116, the long arm 178 of the control lever 176 rests on a stop surface 179 formed in the metal sheet base 166 (FIG. 6). The swinging yoke 159 is formed in the region of the pivot axle 160 with an abutment edge 180 which is directed obliquely relative to the optical axis 104. The pivot axle 160 also supports two torque or elbow springs 181 and 182 (FIG. 9). The spring 181 bears at one side against the film pressure plate 109 and at the other side against the short arm 177 of the control lever 176. The other elbow spring 182 bears also at one side thereof against the film pressure plate 109 and in addition against the swinging yoke 159. The tension of the spring 81 is substantially larger than that of the spring 182. If the rotary ring 164 now starts rotating about a limited angular distance and the linkage 165 swings the yoke 159 clockwise from the position as shown in FIG. 6, the end of the long arm 178 of the control lever 176 is edged against the abutment surface 179 so long until the effect of the stronger torsional spring 181 is overcome upon the abutment of the shorter arm 177 of the control lever 176 against the film pressure plate 109. Accordingly, after brief tilt in clockwise direction, the film pressure plate is tilted about its axis 160 counterclockwise and in the course of the forward movement of the pressure plate toward the film gate the long arm 178 disengages the abutment surface 179 and the film pressure plate 109 is rotated by the weaker spring 182 against the abutment edge 180 on the swinging yoke 159. In this position, the pressure plate 109 is inclined relative to the optical axis 104 and in this inclined position the film deviating roller 172 comes first in contact with the platform 107 of the film strip 15. At the end of the path of movement of the yoke 159, the film pressure plate 109 firmly abuts against the framing platform 107. The successive phases of the motion of the film pressure plate during the clockwise swinging of the yoke 159 are indicated by dash and dot lines in FIG. 6. During the counterclockwise movement of the swinging yoke 59, the aforedescribed positions of the pressure plate and the movements of the control lever 176 occur in the reverse order.

The control mechanism 118, which controls the movements of the sliding carriage 103 and of the film pressure plate 109 in a predetermined and coordinated manner, has a carrier 183 which is rigidly connected to a hand-operated crank 119 (FIG. 7) and which is rotatably mounted on the bearing plate 116 to rotate about an axis 184. The carrier 183 includes a carrier disc 185 which at its center is connected between two axially directed tubular pieces 186 and 187. The winding roller 140 and rotatable control ring 164 are supported for rotation about the axis 184 and are axially spaced apart one from the other. The coupling 123 which alternately connects the driving mechanism 124 for the sliding carriage and the control gears 125 for the film pressure plate to the hand-operated crank 119 includes a coupling disc 188 which is coaxially arranged about the front tubular piece 186 to rotate simultaneously with the carrier 183 and to be axially displaceable on the tubular piece 186. The joint rotation of the carrier 183 and of the coupling disc 188 is insured by two carrier pins 189 projecting in axial direction from the carrier plate 185 and engaging holes 190 in the coupling disc 188. The coupling disc 188 is biassed in axial direction by a spiral spring 191 surrounding the fron tubular piece 186 and urging the coupling disc 188 in the direction away from the base-plate 116. Two coupling actuation pins 192 are hinged against the coupling disc 188 to act thereon from the opposite side than that engaging the springs 191.

The actuation pins are operable to axially displace the coupling disc 188 against the spiral spring 191 into a first end position in which it engages the winding roller 140, whereas the spring 191 urges the coupling disc into a second position in which it engages the control ring 164. In each of the two end positions of the coupling disc, the two carrier pins 189 of the carrier disc 185 pass through the opening 190 in the coupling disc 188.

The rear tubular piece 187 projecting from the center of the carrier disc 185 passes through an opening 193 in the rear wall 116 of the housing and its outwardly projecting end is secured to a cup-shaped crank carrier 194. The outer surface of the crank carrier 194 is provided with a radially directed recess 195 for accommodating a pivot axle 196 of the hinged arm 119 of the hand-operated crank. The pivot axle 196 is offset from the central axis 184 of the carrier and is directed transversely to the latter. In FIG. 7, the hand-operated crank for the film feed is shown in its folded rest position in which the control mechanism 118 cannot be operated. In this position, the handle of the crank 119, which is in the form of a transverse pin 197, lodges in a recess 198 formed in the rear wall 116 of the housing, thus preventing any rotation of the crank 119. If the crank arm 119 is swung about its pivot axis 196 clockwise about 180°, it resumes its operative position in the radial groove 195. In this operative position, the control mechanism 118 can be activated. A one-arm lever 199 is hinged in the interior of the cup-shaped crank carrier 194 to rotate about an axle 200 which is also offset from the axis 184 of the carrier and extends transversely to the latter. This hinged lever 199 supports the actuation pins 192 for the aforementioned coupling disc 188. In the region of the projecting tubular piece 187, the hinge lever 199 is provided with an oblong cutout 201 through which the tubular piece 187 passes in any angular position of the lever 199. The two actuation pins 192 pass through corresponding cutouts 202 in the carrier disc 185 to reach the contact surface on the coupling disc. The end portion of the hinged arm 199 remote from its pivot axle 200 is provided with a pin 203 which projects rearwardly into the radial cutout 195. If the crank 119 is swung over from its rest position shown in FIG. 7 into its operative position in the radial groove 195, it engages the pin 203 and rotates the hinged arm 199, so that the actuation pins 192 axially displace the coupling disc 188 against the biassing spring 191 until the coupling disc engages the winding roller 140. The coupling contact is established by the radial projections 204 on the coupling disc, engaging corresponding recesses 205 in the winding roller 140. If, however, the crank arm 119 is slightly turned away from the pin 203, the compression spring 191 disengages the projections 204 from the winding roller 140 and the coupling disc 188 engages with its arc-shaped rearwardly projecting flange 206 the correspondingly shaped recess 207 in the control ring 164 (FIGS. 7 and 15). Whereas in the previous end position the coupling disc 188 connected the winding roller 140 for joint rotation with crank 119, in the latter position the crank is connected for joint operation with the control ring 164. In order to ensure that the coupling connects the hand-operated crank 119 to the winding roller and to the control ring in appropriate sequence, the rim of an opening 193 in the rear wall 116 of the housing is provided with a stop lip 208 projecting radially towards the center axis 184 of the carrier. The hinged coupling actuation lever 199 is formed at its free end with an angular piece 209 projecting towards the stop lip 208 and being dimensioned such that in the unactivated position of the hinge lever 199, it is clear of the stop lip 208, whereas in a tilted position of the lever 199, it projects into the range of the stop lip 208. Accordingly, in the latter case, the crank 119 can rotate the carrier 183 about an angle which is less than 360°. In this example, the configuration of the stop lip 208 is designed to permit a rotational angle of 320° as indicated in FIG. 16 by the outer arrow leading from the point A to the point B.

The outer curved arrows in FIG. 16 are directed clockwise to indicate the rotational direction of the hand-operated crank 119 during which the detachable cassette part 11 is moved from its position in the cassette in which the film roll is coiled to its detached end position in which the film roll is unwound. The inner curved arrows indicate the reversed proces, during which the detachable cassette part is returned to its receptacle. At the angular position B of the crank lever 119, the carrier disc 185 and the coupling disc 188 are rotated in the coupling position as illustrated in FIG. 7, that means, in a position in which the coupling process for establishing either the joint rotation between the coupling disc and the winding roller 140 or between the coupling disc and the control ring 164, can take place. In rotating the crank lever 119 from position A to position B when the film roll is uncoiled, or from position B to position A when the film roll is coiled, the coupling disc 188 is under the effect of the spiral pressure spring 19 and thus, the coupling flange 206 rests on the rotary ring 164, whereas the projections 204 engage for joint rotation the winding roller 140 (FIG. 7). In position B, the coupling flange 206 is aligned with the corresponding arcuate recess 207 of the control ring 164. Upon releasing the crank arm 119 from the pin 203 during the coiling of the film roll and by compressing the crank 119 during the uncoiling of the film roll, the coupling flange 206 enters the corresponding recess 207 in the control ring and the latter is rotated jointly with the hand-operated crank lever 119.

The operation of the control mechanism 118 in connection with the hand-operated crank 119 is as follows:

Initially, the sliding carriage 103 is in its starting position in the cassette receptacle. The hand crank 119 is now swung up from its folded rest position, as illustrated in FIG. 7, into its operative position opposite the pin 203 in the cutout 195. The coupling disc 188 has its coupling flange 206 abutting against the upper surface of the control ring 164 and couples therefor the winding roller 140 to the crank 119 (FIG. 7). If, now, the hand-operated crank 119 is rotated clockwise from its position A to its position B (FIG. 16), the hinge lever 199, the carrier 183, the coupling disc 188 and the winding roller 140 can now be rotated about a angle of 320°. The winding roller 140 via the draw strings 144 and 145 drives the sliding carriage 103 from its starting end position in the cassette receptacle into its opposite end position. As soon as the carriage 103 advances to this opposite end position, the angular piece 209 at the end of the hinge arm 199 abuts against the stop lip 208 in the opening 193 and consequently, the clockwise movement of the crank 119 is interrupted. At this point, the crank arm 119 has to be slightly lifted until the angular piece 209 at the end of the hinge arm 199 is removed from the plane of the stop lip 208, and at the same time, pins 192 permit the compression spring 191 to disengage the coupling disc 188 with its coupling projections 204 from the winding roller 140 whereas the coupling flange 206 enters the corresponding recess 207 in the control ring 164. If, now, the crank lever 119 is turned again clockwise from the position B to the position A in FIG. 16, the winding roller 140 is stationary whereas the control ring 164 is angularly displaced from the position indicated by full lines in FIG. 9 into its position indicated by dash and dot lines. This angular displacement of the control ring 164 is transmitted via the sliding link 169, lever 168 and the sliding link 170 to the swinging yoke 159 which, in turn, transfers the film pressure plate 109 against the film framing platform 107 in the manner as described before in connection with FIG. 6. At this moment, the insertion process of the detachable cassette part 11 into the camera body is completed and the camera is ready to take pictures. The crank arm 119 can be swung back into its rest position as illustrated in FIG. 7 and can remain in this rest position so long until it is desired to exchange the film cassette and the retrieval of the detached cassette part 11 into the cassette receptacle is necessary. In this case, the film pressure plate 109 is swung away from the platform 107 into its inoperative position behind the baseplate 116 and the carriage 103 is returned from its end position remote from the cassette receptacle into its starting position in the receptacle. The aforedescribed movements of the pressure plate and of the sliding carriage now take place in the reverse order, whereby the hand-operated crank 119 is rotated counterclockwise from the position A to B and subsequently from the position B to position A as indicated in FIG. 16 by the curved arrows. When the crank arm has attained its position A, the detachable cassette part 11 is again united with the main cassette part 10 in the cassette receptacle and the whole cassette 100 is ready to be removed from the receptacle 102.

The winding roller 140 which also operates about a common axis 184 of the carrier 183, is provided with an axially directed angular extension 210 which is formed on its periphery with two arresting notches 211 and 212 spaced apart one from the other about a central angle of 320°. As illustrated in FIG. 8, the base-plate 116 pivotally supports a spring biassed pawl 213 which, with its arresting nose 214, is engageable with one of the arresting notches 211 and 212. The arresting pawl 213 also supports a transversely directed locking pin 215, which is guided in the slot guide 216 in the control ring 164 (FIGS. 8 and 15). The locking pin 215 thus slides during the rotation of control ring 164 along the curved edges of the guide slot 216 to a radially directed cutout 217 communicating with one end of the slot 216. This radially directed cutout or guiding slot extension 217 serves for receiving the locking pin 215 when the arresting nose 214 of the pawl 213 is disengaged from the arresting notches 211 or 212 and slides on the periphery of the annular extension 210. In this manner, the control ring 164 during the rotation of the winding roller 140 is locked by the locking pin and is prevented from any rotational movement. Only after the winding roller 140 is angularly displaced about a central angle of 320°, the arresting pawl 213 engages the arresting notch 212 and consequently the locking pin 215 is unhooked from the radial extension 217 and enters the arc-shaped guide slot 218. As a result, the control ring 164 is permitted to rotate about an angle of 40° corresponding also to the length of the guiding slot 216. The arresting nose 214 of the pawl 213 remains arrested in the notch 212 so that the winding roller 140 during the limited rotational movement of the control ring 164 is prevented from any rotation.

Referring to FIG. 12, the film pressure plate 109 is arrested in its working position in contact with the film gate 108 or framing platform 107 by an arresting mechanism 218. This arresting mechanism includes two spring-loaded arresting poles 219 and 220 (FIGS. 12-14) constituted by the free arms of a U-shaped two-arm lever 222 which is pivotally supported on brackets 116 at both sides of the base-plate 116. The end portions of the free arms 220 and 224 of the U-shaped lever or yoke 222 exceed the upper and lower guides 136 and 137. Both arresting poles 219 and 220 cooperate with corresponding arresting cutouts 225 and 226 formed on the respective free ends of the branched arms 161 and 162 of the swinging yoke 159. The arresting cutouts 225 and 226 are formed with abutment edges 227 and 228 which are supported by the poles 219 and 220 when the swinging yoke 159 swings up the film pressure plate 109 against the platform 107 and thus hold the pressure plate in its operative position. The abutment edges 227 and 228, as well as the surfaces of the arresting poles 219 and 220, are inclined in tangential direction relative to the path of movement of the arresting yoke 222 so that the arresting poles will be gradually guided against the recessed step surfaces 225 and 226. In this manner, any manufacturing tolerances are automatically neutralized and it is insured that the film pressure plate 109 is arrested in an exact position with respect to the film framing platform 107. The arresting U-shaped lever or yoke 222 supports also an additional arm 221 branching from arm 223 and cooperating with a releasing mechanism 229. The releasing mechanism tilts, at the beginning of the driving movement for the deployment of the cassette part 11, in a manner which will be described below, the U-shaped arresting lever or yoke 222 so as to enable the film pressure plate 109 to reswing into its rest position behind the base-plate 116 before the carriage 103 crosses during its return movement the trajectory of the film pressure plate.

Similarly, the sliding carriage 103 is arrested in its working end position remote from the cassette receptacle by an additional arresting device 230. The carriage arresting device 230 includes an arresting arm 231 pivotally mounted on the guiding bracket 137 and supporting a control pin 232 and a angled arresting nose 233. The control pin 232 projects into a guide slot 234 formed in the lower part of the lateral arm 162 of the swinging yoke 159. In swinging the yoke 159, the guide slot 234 angularly displaces via the control pin 232 the arresting arm 231. In the swung up position of the swinging yoke 159, that means, when the film pressure plate is in its working position in contact with the film framing platform 107, the arresting arm 231 is rotated to such a position that its arresting angular endpiece 233 is brought into engagement with the end of the U-shaped guiding slide 129 of the carriage 103 (FIG. 14). As a result, the carriage is now firmly held in its deployed end position between the stop cam 131 on the base-plate 116 and the arresting nose 233. If the film pressure plate 109 is again swung up from its rest position into its working position, the arresting arm 231 is rotated from its position, illustrated in FIG. 4, clockwise so that its arresting piece 233 releases the carriage 103. In the rest position of the film pressure plate 109, that means, in the swung down position of the swinging yoke 159, the arresting angular piece 233 is brought into engagement by means of a tension spring attached between the lateral bracket 137 and the arresting arm 231, into engagement with the teeth of the driving gear 134 which is supported for rotation on the lower entraining member 133 on the carriage (FIG. 13). The clearance between the arresting angular piece 233 when engaging the gap between two teeth of the driving gear 134 and the first tooth of the rake 135 is dimensioned such that upon disengagement of the arresting teeth 233 from the driving gear 134 is returned again into its position indicated by full lines in FIGS. 11 and 12 provided that the arresting nose 246 after a full rotation of the carrier disc 185 by the crank arm 119 engages again the arresting recess 247.

As has already been explained before, the housing 101 is formed with a recess 112 adjoining the cassette receptacle 102 for accommodating the cassette main part 10 when the cassette unit 100 is inserted into the receptacle. By providing this recess, the overall width of the camera can be significantly reduced. The film cassette unit 100, therefore, cannot be inserted into the cassette compartment along a straight line parallel to the optical axis 104 but it is inserted therein by a sliding and tilting movement. To facilitate this combined movement, the upper and lower guiding brackets 136 and 137 are formed with a guiding shoulder 269, respectively, for guiding corresponding webs or ribs 99 formed on the upper surface of the film cassette 100 (FIGS. 3 and 4). The guiding shoulder 269 in cooperation with the guiding webs 99 provide for an exact introduction of the cassette unit into its receptacle, whereby the entrainment pieces 132 and 133 of the sliding carriage engage automatically the carrier pin 92 on the detachable cassette part 11; gear 18 coupled with the sprocket roller in the cassette and situated on the outer surface of the latter, engages driving gear 120 in the camera and the gear 56 coupled to the film takeup spool in the detachable cassette part 11 is brought into engagement with the driving gear 134 supported on the lower entraining piece 133 of the sliding carriage.

It will be understood that each of the elements described above, or two or more together, may also find a useful application in other types of camera constructions differing from the single-lens reflex camera described above. For example, the control mechanism for the carriage 103 and the pressure plate 109 need not be controlled by a manually operated crank arm 119 but instead, it can be operated by an electromotorical drive. In this case, it is of advantage when, instead of tie strings and winding rollers 140 and 141 coupled to the sliding carriage, there are provided two electromotorically driven driving spindles or driving worm gears arranged transversely to the optical axis of the camera and engaging corresponding driving knobs arranged on the upper and lower edges of the carriage. The embodiment employing two driving spindles or worms engaging corresponding knobs guarantees that the carriage 103 is driven without any tendency to tilting. The two driving spindles or screws are supported for rotation on opposite ends of the base-plate 116 and coupled one to the other by suitable gear transmission.

In the preferred embodiment of this invention, there is also provided an additional unlocking key 217 which is manually actuated and cooperates with a pressure key 39 on the film cassette 100. The structure and operation of the pressure key 39 is described in detail in the aforementioned German patent application B 29 25 496.4. If, due to the termination of the film strip, a full advance of the shutter cocking lever 122 is no longer possible, the unlocking key 271 is compressed and the pressure key 39 is to disengage the coupling between the film perforation engaging sprocket roller and the gear 18 in the cassette unit 100. The gear 18 is now idling and, therefore, the blocking of the driving gear 120 which is in mesh with the gear 18 is removed. The advance movement of the shutter cocking lever 122 can now be completed and the camera shutter cocked whereby all above-described conditions for deploying the detachable cassette part 11 are fulfilled.

While the invention has been illustrated and described as embodied in specific examples of a photographic still camera, it is not intended to be limited to the details shown, since various modifications and structural changes may be made without departing in any way from the spirit of the present invention.

Without further analysis, the foregoing will so fully reveal the gist of the present invention that others can, by applying present knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic still camera having a housing formed with an aperture for an objective centered about an optical axis, comprising an exposure framing platform fixedly mounted in said housing in a film plane extending at right angles to said optical axis, said framing platform having a film gate aligned with said objective aperture, a film cassette receptacle formed at an outer lateral wall of said housing and communicating with the interior of said housing behind said framing platform when considered in the direction of incoming light, said receptacle being designed for receiving a bipartite film cassette assembled of a main cassette part and a detachable cassette part, a cassette guiding track provided in the interior of said housing behind said framing platform and including guiding means directed transversely to said optical axis, a sliding carriage guided on said guiding means to move between a starting position in said receptacle and a working end position past said film gate, said carriage including at least one entrainment piece engageable with said detachable cassette part to carry the same between said starting position and said end working position, and a film pressure plate arranged behind said guiding track and being operable for movement in the direction of said optical axis to abut against said film gate.

2. A camera as defined in claim 1, wherein said housing includes a detachable rear wall and said guiding means together with said sliding carriage and said film pressure plate being supported on said detachable rear wall.

3. A camera as defined in claim 2, wherein said rear wall has a cup-shaped configuration and includes a base plate extending transversely to the optical axis and supporting said guiding means, said sliding carriage, said film pressure plate and actuation means for said carriage and said pressure plate.

4. A camera as defined in claim 3, wherein said actuation means includes a control mechanism common to said carriage and said film pressure plate to control their respective movements in a predetermined order, and further including a driving member for said control mechanism.

5. A camera as defined in claim 4, wherein said driving member is a hand-operated crank arm.

6. A camera as defined in claim 5, wherein said common control mechanism includes a coupling operable for transmitting the movement of the driving member alternately to the actuation mechanism for said sliding carriage and to the actuation mechanism for said film pressure plate.

7. A camera as defined in claim 6, wherein said driving member for said actuation means, said control mechanism and the actuation means for said sliding carriage and for said film pressure plate are constructed separately from said cocking or advancing lever of said camera and from said film feeding and shutter cocking mechanism and are disconnectably coupled thereto.

8. A camera as defined in claim 7, wherein said film pressure plate is supported on a swinging yoke and said actuation means for said pressure plate includes a control ring, a lever transmission coupling said control ring to said swinging yoke to transform an angular displacement of said control ring into a swinging movement of the yoke.

9. A camera as defined in claim 8, wherein the control mechanism for the sliding carriage and the pressure plate includes a carrier supported for rotation on said base plate and being connected to said driving means, one of said winding rollers and said control ring being coaxially arranged about said carrier and spaced apart one from the other, a coupling disc connected for joint rotation with said carrier and being axially movable between a first coupling position in connection with said one winding roller and another coupling position in connection with said control ring, a biassing spring for urging said coupling disc into said other coupling position and at least one movable coupling pin supported for joint rotation with said carrier and being cooperable to move said coupling disc into said one coupling position.

10. A camera as defined in claim 9, wherein said coupling pin is suported on a coupling lever hinged on said carrier for rotation about an axis extending transversely to the axis of rotation of said carrier, the driving member including a collapsable crank arm cooperating with said hinged lever to displace via said coupling pin said coupling disc toward said one coupling position.

11. A camera as defined in claim 10, wherein said carrier includes a cup-shaped outer disc for supporting said collapsable crank arm for rotation about a pivot axle extending transversely to said axis of rotation of said carrier, and further including tubular sleeve supported at one end thereof for rotation about its longitudinal axis on said base plate and being secured at the other end thereof to said cup-shaped disc, said coupling lever being hinged in the interior of said cup-shaped disc and supporting an abutment pin facing a cutout in said cup-shaped disc, and said collapsable crank arm being unfoldable into a working position opposite said abutment pin.

12. A camera as defined in claim 11, wherein said removable rear wall of the housing is formed with a circular opening which is concentrical with the rotary axis of said carrier and covered from the outside by said cup-shaped disc, a stop lip projecting radially into said circular opening, said hinged coupling lever being provided with an angular member directed towards said stop lip and having a length which in one position of said coupling lever permits its movement behind the plane of said stop lip and in another position of said coupling lever abuts against the edges of the stop lip.

13. A camera as defined in claim 12, wherein said stop lip extends over a central angle of about 40° whereby said coupling lever and thus said carrier are permitted to rotate in said other position of said coupling lever about 320°.

14. A camera as defined in claim 12, wherein said coupling pin displaces said coupling disc into engagement with said winding roller when said angular member on said coupling lever is displaced into the plane of said stop lip and, alternatively, to release said coupling disc for engagement, by the action of said biassing spring, with said control ring when said angular member of said coupling lever is displaced beyond the plane of said stop lip.

15. A camera as defined in claim 14, wherein said winding roller is formed witn an annular attachment provided with two arresting notches spaced apart about a central angle corresponding to that of said stop lip, and said base plate in the rear wall of said housing supporting for rotation a spring biassed pawl engageable with said arresting notches in said annular attachment.

16. A camera as defined in claim 15, wherein said spring biassed pawl cooperating with said arresting notches is provided with a locking pin projecting into an arc-shaped slot formed concentrically in said control ring and being at one end thereof congruent with radial short slot, said arc-shaped concentric slot guiding said locking pin of said pawl when the latter engages said arresting notches while said locking pin enters said radial slot when said pawl disengages said notches and slides on the periphery of said annular attachment while said control ring is locked in a fixed angular position.

17. A camera as defined in claim 8, wherein an edge of said film pressure plate remote from said cassette receptacle supports a film deviating roller, and said actuation means for said film pressure plate being linked to said swinging yoke in such a manner as to impart to said pressure plate during its forward movement against the film gate a tilting movement in which the deviating roller is initially trailing the opposite edge, whereupon the film deviating roller is leading the opposite edge until it abuts against said film framing platform and said pressure plate abuts against said film gate.

18. A camera as defined in claim 17, wherein said actuation means for said film pressure plate includes a two-arm control lever supported for rotation about the pivot axle of said pressure plate on said swinging yoke, one arm of said control lever being spring-biassed to engage the side of the pressure plate adjoining said film deviation roller in order to tilt the latter in a leading position relative to the opposite side, and the other arm of said lever abutting in the rest position of said film pressure plate against a stationary stop surface provided on said base plate, said swinging yoke having an inclined abutment surface engageable with said opposite side of said pressure plate to maintain the leading position of the deviation roller during the forward travel of said swinging yoke.

19. A camera as defined in claim 18, wherein said control lever in the actuation means for said pressure plate is spring-biassed by a first torsional spring urging the one arm of said control lever towards said pressure plate and by a second torsional spring biassing said film pressure plate relative to the supporting swing yoke to turn the opposite side of said pressure plate against said inclined abutment surface whereby said first spring is stronger than said second spring.

20. A camera as defined in claim 19, wherein said film pressure plate is provided with two pairs of juxtaposed and laterally extending projections abuttable against the film framing platform and forming spacing means defining a narrow film feeding channel between said pressure plate and said framing platform.

21. A camera as defined in claim 19, wherein said supporting swing yoke for said pressure plate embraces said base plate and is pivotally supported thereon, the intermediate part of said yoke being formed with a plate supporting at its free end pivot axle of the two-arm lever for controlling said pressure plate, and defining said inclined abutment surface.

22. A camera as defined in claim 21, wherein said base plate has two lateral guiding brackets projecting at right angles thereto, and the arms of said supporting swing yoke being pivotally mounted on the juxtaposed parts of said guiding brackets.

23. A camera as defined in claim 8, wherein said actuation means for said film pressure plate includes an arresting mechanism for locking said film pressure plate in its working position in abutment on said film framing platform.

24. A camera as defined in claim 23, wherein said pressure plate arresting mechanism includes at least one arresting pole pivotally mounted on said guiding brackets of said base plate and being spring-biassed by a tension spring into engagement with arresting recesses formed at the ends of at least one arm of said supporting swing yoke.

25. A camera as defined in claim 24, wherein said arresting mechanism for said film pressure plate includes an arresting yoke embracing said base plate and being pivotally mounted on said guiding brackets, said poles being formed on the free arms of said arresting yoke to engage corresponding recess portions formed on the free ends of arms of said supporting yoke.

26. A camera as defined in claim 25, further including an additional arresting mechanism for locking said guiding carriage in its working position remote from said cassette receptacle.

27. A camera as defined in claim 26, wherein said additional arresting mechanism includes an arresting arm pivotally mounted on one of said guiding brackets of said base plate and being formed with a projecting control pin, said supporting swing yoke for said pressure plate having in one arm thereof a guiding slot engaging said control pin to lift the end of said control lever into engagement with one of the U-shaped sliding members of said sliding carriage thus arresting the same in its working end position, and a spring for biassing the arresting arm away from said sliding carriage.

28. A camera as defined in claim 27, wherein said arresting arm for said sliding carriage is provided at its end with an angular arresting piece which in the position of said arresting arm away from said sliding carriage engages a gap between two teeth of the driving gear mounted on the entrainment piece of said sliding carriage when the latter is in its working end position.

29. A camera as defined in claim 28, having a shutter releasing push button arranged on said rear wall of the housing and a locking mechanism operable for locking said push button when said film pressure plate is in its rest position and for unlocking said push button when said film pressure plate is swung up and arrested in its working position in contact with said film framing plate and the sliding carriage is displaced into its working end position remote from said cassette receptacle.

30. A camera as defined in claim 29, wherein said locking mechanism for said shutter releasing push button includes a locking arm pivotally mounted on one guiding bracket of the base plate to engage in one angular position thereof said push button and to release said push button in another angular position thereof, said supporting swing yoke for said pressure plate being formed with a surface engageable with said locking arm to drive the same between said angular positions, a biassing spring for urging said locking lever towards the angular position thereof in which it releases said push button and said surface being arranged for permitting the movement of said locking arm into said releasing position when said swing yoke is swung up and said film pressure plate abuts against said film framing platform.

31. A camera as defined in claim 30, further including an additional locking mechanism cooperating with said first locking mechanism to arrest said common control means for the carriage and the pressure plate when said shutter releasing push button is actuated and to unlock said control means when the camera cocking lever is subsequently advanced.

32. A camera as defined in claim 31, wherein said additional locking mechanism includes a pivotable locking lever supported on said rear wall of the camera housing in operative proximity to said shutter releasing push button and being coupled to said camera cocking lever, a two-arm arresting lever pivotally mounted on one of said guide brackets of said base plate for cooperation with said pivotable locking lever, a locking linkage coupled between said common control means and the other arm of said locking lever, said linkage including an arresting nose which is spring-biassed against the periphery of the carrier disc of the common control means to engage an arresting notch formed in said periphery whereby upon the advance of said camera-cocking lever said locking lever is turned to block said two-arm locking lever.

33. A camera as defined in claim 32, further including a manually operable cassette latch arranged for sliding movement on said camera housing and including at least one arresting hook for engaging corresponding recesses formed on the cassette main part to hold the same on said cassette receptacle, and blocking means for said cassette latch, said blocking means being operable for arresting said cassette latch when no film cassette unit is present or when the main cassette part is attached to said receptacle and said detachable cassette part is displaced into the camera housing.

34. A camera as defined in claim 33, wherein said blocking means lock said cassette latch in its open position when said cassette unit is removed from the cassette receptacle and arrest said latch in its arresting position when the main cassette part is present and the detachable cassette part is placed in its working position in the camera body.

35. A camera as defined in claim 34, wherein said blocking means for said cassette latch includes resetting spring for holding said ledge in its locking position, an elbow lever pivotally mounted on said base plate and supporting on one arm thereof a control pin, projecting in a guiding slot in said base plate, a biassing spring for urging said elbow lever into a depressed position in which the other arm of said elbow lever is in the path of movement of a sliding member coupled to said cassette latch, said control pin projecting through said guide slot into said cassette receptacle to be displaced into the opposite end position in said guide slot when the cassette unit is inserted into the receptacle whereby the other arm of said elbow lever is displaced from the path of movement of said sliding member to release said cassette latch.

36. A camera as defined in claim 35, wherein said detachable cassette part is provided with a projecting control element, preferably the end portion of the shaft of said film takeup spool, which cooperates with the control pin of said elbow lever.

37. A camera as defined in claim 35, further including an additional locking device for said common control means which blocks the latter only upon the removal of said film cassette unit from said cassette receptacle.

38. A camera as defined in claim 32, wherein a part of said locking linkage is displaceable in the path of movement of said sliding member for said cassette latch.

39. A camera as defined in claim 38, wherein said locking linkage includes a two-arm arresting lever supporting said arresting nose which is engageable with the notches in the periphery of said carrier disc, a sliding rod linked between one arm of said arresting lever and said two-arm locking lever, said arresting nose engaging one of said arresting notches at such an angular position of the carrier disc of said control means at which said sliding carriage is situated either in its starting position in said cassette receptacle or in its working end position remote from said receptacle, and the film pressure plate is situated either in its rest position behind said base plate or in its working position in contact with said film framing platform, and said sliding rod being provided with means for arresting said locking linkage in the starting and in the end position of said control means in response to the actuation of said cassette latches.

40. A camera as defined in claim 23, further including unlocking means for releasing said film pressure plate from its working position in contact with said film framing platform.

41. A camera as defined in claim 40, wherein said unlocking means includes a guide slot linking said control ring to said locking linkage, actuation nose formed on said sliding rod of said linkage and a pivotable coupling lever arranged between said actuating nose and the arresting pole for said supporting swing yoke, said coupling lever disengaging in response to the displacement of said actuation nose said arresting pole from said supporting swing yoke when the latter is in its swung up position.

42. A camera as defined in claim 6, wherein said actuation means for said sliding carriage includes two meshing gears each provided with a winding roller, at least one drawstring having its end portions wound up on said winding rollers and an intermediate portion attached to said sliding carriage and guided past deviation rollers.

43. A camera as defined in claim 42, wherein at least one deviation roller is supported for rotation on a swingable support which is spring biassed to tension said draw string.

44. A camera as defined in claim 43, wherein said winding rollers have different diameters dimensioned such that upon traverse of the sliding carriage from one end position into the other position a length of the draw string is wound up on said winding rollers exceeding the length of the track traversed by said carriage.

45. A camera as defined in claim 42, including two draw strings in the actuation means for said sliding carriage, each string having its free end portion wound on said winding rollers, one string extending in close proximity to the upper longitudinal edge and the other string extending along the lower longitudinal edge of said base plate and each being connected with a corresponding U-shaped sliding member of said carriage.

46. A camera as defined in claim 45, wherein said draw strings have a rectangular cross-section to ensure a limited height of the wound up layer on said winding roller whereby the wound up end portions of said strings are superposed in a common guiding groove extending over the entire circumference of the respective winding rollers.

47. A camera as defined in claim 46, wherein said guiding groove is formed as the center of the crown circle of said gears connected to respective winding rollers.

48. A camera as defined in claim 45, wherein said base plate is formed with a cutout for passing through said film pressure plate into its rest position whereby one of said strings extends along an upper edge and the other string extends along the lower edge of said cutout.

49. A camera as defined in claim 4, including conventional film feeding and shutter cocking mechanisms operable by a cocking lever or the camera, and further comprising a pair of driving gears arranged in said camera, said main cassette part being provided with a sprocket roller connected to a first gear engageable with one of the driving gears located in said guiding track at the starting position of said sliding track, said detachable cassette part being provided with a film takeup spool coupled to a second gear, said second gear being engageable with said other driving gear which is located in said guiding track in the end position of said sliding carriage.

50. A camera as defined in claim 3, wherein said guiding means for said sliding carriage is formed by the upper and lower longitudinal edges of said base plate and said sliding carriage including U-shaped lateral slides embracing said upper and lower guiding edges.

51. A camera as defined in claim 50, wherein said sliding carriage further supports two entraining pieces projecting at right angles to the plane of said base plate and being shaped for engaging a carrier pin formed on the detachable part of said cassette, one of said entraining pieces supporting for rotation an additional driving gear which is engageable with the gear mounted on the detachable cassette part and coupled to the film takeup spool in said cassette part and a tooth rack mounted on said base plate along said guiding edges for engaging said additional driving gear.

52. A cassette as defined in claim 51, wherein the length of said rack is dimensioned such that when said sliding carriage with said additional driving gear is in said locking end position remote from said cassette receptacle, said additional driving gear is out of engagement from said rack.

53. A camera as defined in claim 50, wherein said base plate supports two guiding brackets arranged at right angles to the latter and extending around the entire length of its guiding edges, said guiding brackets being formed with guiding grooves extending in longitudinal direction for slidably engaging guiding pins formed on said detachable cassette part.

54. A camera as defined in claim 53, wherein said guiding pins on said detachable cassette part are formed by projecting end portions of the shaft of said film takeup spool.

55. A camera as defined in claim 1, wherein said camera housing is formed with a recess communicating with the inlet of said cassette receptacle to accommodate the cassette main part, and the inner walls of said cassette receptacle being formed with two juxtaposed guiding shoulders and said film cassette unit being formed with guiding projections cooperating with said guiding shoulders.

56. A camera as defined in claim 55, wherein the inlet of said cassette receptacle is surrounded by a groove and said main part of the cassette including a corresponding rib fitting said groove to provide a light-tight seal.

57. A camera as defined in claim 56, further including a film sensitivity feeler arranged in said recess for the main cassette part and said main cassette part including an adjustable film sensitivity indicator cooperating with said feeler to adjust the same according to the adjusted film sensitivity.

* * * * *